United States Patent
Woodruff et al.

(10) Patent No.: US 12,187,873 B2
(45) Date of Patent: *Jan. 7, 2025

(54) THREE-DIMENSIONAL PRINTING

(71) Applicant: Hewlett-Packard Development Company, L.P., Spring, TX (US)

(72) Inventors: Shannon Reuben Woodruff, San Diego, CA (US); Stephen G. Rudisill, San Diego, CA (US); Erica Fung, San Diego, CA (US); Rachael Donovan, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,339

(22) Filed: Oct. 6, 2023

(65) Prior Publication Data
US 2024/0059866 A1    Feb. 22, 2024

Related U.S. Application Data

(63) Continuation of application No. 17/047,181, filed as application No. PCT/US2018/057353 on Oct. 24, 2018, now Pat. No. 11,780,988.

(51) Int. Cl.
*B29C 64/165* (2017.01)
*B33Y 70/00* (2020.01)
(Continued)

(52) U.S. Cl.
CPC ............... *C08K 5/06* (2013.01); *B33Y 70/00* (2014.12); *B29C 64/165* (2017.08);
(Continued)

(58) Field of Classification Search
CPC .......... B29C 64/165; B29K 2105/0032; B29K 2105/0038
See application file for complete search history.

(56) References Cited

U.S. PATENT DOCUMENTS 5,204,055 A    4/1993  Sachs et al.
5,901,441 A    5/1999  Kawamura et al.
(Continued)

FOREIGN PATENT DOCUMENTS

CA    2981818 A1    4/2018
CN    103842157 A    6/2014
(Continued)

OTHER PUBLICATIONS

Author Unknown. "1,3-Propanediol", retrieved from: https://www.sigmaaldrich.com/US/en/substance/13propanediol7609504632, Retrieved on: (Year: 2022), 2 pages.
(Continued)

*Primary Examiner* — James Sanders
(74) *Attorney, Agent, or Firm* — Dierker & Kavanaugh, P.C.

(57) ABSTRACT

An example of a multi-fluid kit for three-dimensional (3D) printing includes an elasticity agent to be applied to at least a portion of a build material composition during 3D printing and a fusing agent to be applied to the at least the portion of the build material composition during 3D printing. The elasticity agent includes a plasticizer having: a formula (I):

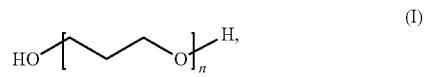

wherein n is an integer ranging from 3 to 8; or a formula (II):

(Continued)

wherein m is an integer ranging from 3 to 8. The fusing agent includes an energy absorber.

16 Claims, 4 Drawing Sheets

(51) Int. Cl.
 *C08K 5/06*  (2006.01)
 *B29K 77/00*  (2006.01)
 *B29K 105/00*  (2006.01)
 *B33Y 10/00*  (2015.01)

(52) U.S. Cl.
 CPC .. *B29K 2077/00* (2013.01); *B29K 2105/0032* (2013.01); *B29K 2105/0038* (2013.01); *B33Y 10/00* (2014.12)

(56) References Cited

U.S. PATENT DOCUMENTS

| | | |
|---|---|---|
| 5,902,441 A | 5/1999 | Bredt et al. |
| 6,110,266 A | 8/2000 | Gonzalez-Blanco et al. |
| 7,972,426 B2 | 7/2011 | Hinch et al. |
| 8,651,390 B2 | 2/2014 | Hinch et al. |
| 9,643,359 B2 | 5/2017 | Baumann et al. |
| 2007/0238056 A1 | 10/2007 | Baumann et al. |
| 2007/0241482 A1 | 10/2007 | Giller et al. |
| 2008/0281019 A1 | 11/2008 | Giller et al. |
| 2011/0012072 A1 | 1/2011 | Luecke et al. |
| 2016/0347929 A1 | 12/2016 | Bendler et al. |
| 2018/0029291 A1 | 2/2018 | Matzner et al. |
| 2018/0126631 A1 | 5/2018 | Nauka et al. |
| 2018/0208706 A1 | 7/2018 | Green et al. |
| 2019/0016045 A1 | 1/2019 | Wright et al. |
| 2021/0095152 A1 | 4/2021 | Emamjomeh et al. |

FOREIGN PATENT DOCUMENTS

| | | |
|---|---|---|
| CN | 105885395 A | 8/2016 |
| CN | 107073825 A | 8/2017 |
| CN | 107787271 A | 3/2018 |
| EP | 2001656 B1 | 10/2014 |
| JP | S62-116661 A | 5/1987 |
| WO | 2007/114895 A2 | 10/2007 |
| WO | 2017/014784 A1 | 1/2017 |
| WO | 2017/180159 A1 | 10/2017 |
| WO | 2017/196330 A1 | 11/2017 |
| WO | 2019/108288 A1 | 6/2019 |

OTHER PUBLICATIONS

Author Unknown. "Poly(tetrahydrofuran)", retrieved from: https://web.archive.org/web/20200225211008/https://polymerdatabase.com/polymers/polytetrahydrofuran.html, Retrieved on: (Year: 2022), 2 pages.

Author Unknown. "Poly(tetrahydrofuran)", retrieved from: https://www.sigmaaldrich.com/US/en/product/aldrich/345334, Retrieved on: (Year: 2022), 8 pages.

Faraday, M., "X. The Bakerian Lecture.—Experimental relations of gold (and other metals) to light", Phil. Trans. R. Soc. Lond., vol. 147, Jan. 1, 1857, pp. 145-181.

Fay, C., "HP MultiJet Fusion 3D Printer Redefines 3D Printing", 3D Printing Industry, Oct. 26, 2017, 8 pages.

Garcia, G., et al., "Dynamically modulating the surface plasmon resonance of doped semiconductor nanocrystals", Nano Letters, 11, Aug. 22, 2011, pp. 4415-4420.

Gross, B.C., et al., "Evaluation of 3D printing and its potential impact on biotechnology and the chemical sciences", Anal. Chem. 2014, 86, Jan. 16, 2014, pp. 3240-3253.

Kanehara, M., et al., "Indium Tin Oxide Nanoparticles with Compositionally Tunable Surface Plasmon Resonance Frequencies in the Near-IR Region", JACS Communications, vol. 131, No. 49, Nov. 18, 2009, pp. 17736-17737.

Milligan, W. O., et al., "Morphology of Colloidal Gold—A Comparative Study", Journal of the American Chemical Society, vol. 86. Sep. 1, 1964, pp. 3461-3467.

Sunkara, H., et al., "DuPont Cerenol(Trademark)—A New Family of High Performance Bio-Based Polymers", DuPont, Oct. 19, 2006, 34 pages.

Usui, H., et al., "Optical transmittance of indium tin oxide nanoparticles prepared by laser-induced fragmentation in water", J. Phys. Chem. B, vol. 110, No. 26, Jun. 13, 2006, pp. 12890-12895.

Van Der Zande, B. M. I, et al., "Aqueous gold sols of rod-shaped particles", The Journal of Physical Chemistry B, vol. 101, No. 06, 1997, pp. 852-854.

Weiser, H. B., et al., "Von Weimarn's Precipitation Theory and the Formation of Colloidal Gold", J. Phys. Chem. 1932, 36, 7, Jul. 1, 1932, pp. 1950-1959.

Younker, J. M., et al., "Computational screening of renewably sourced polyalkylene glycol plasticizers for nylon polyamides", Polymers for Advanced Technologies, vol. 27, Issue 1, 2016, pp. 273-280.

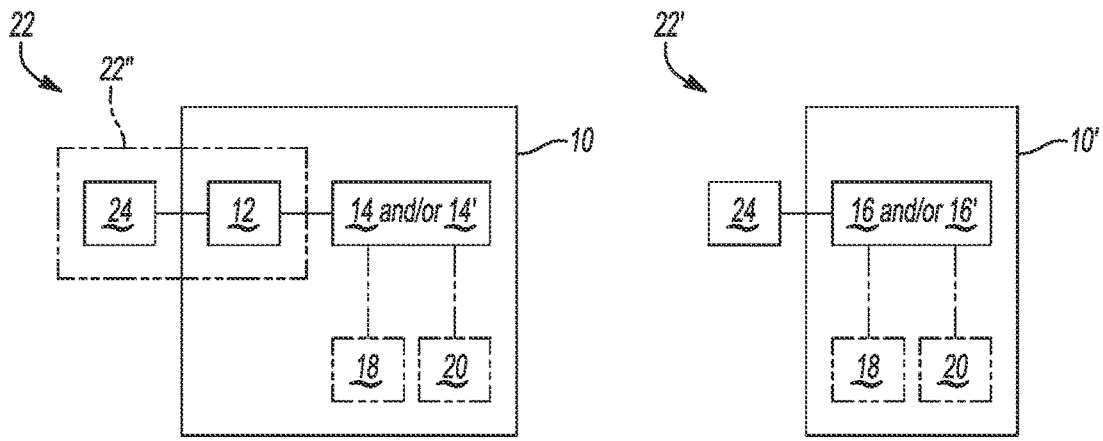

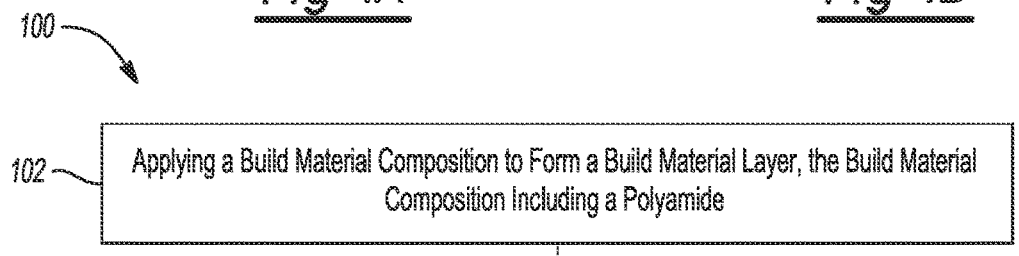

102 — Applying a Build Material Composition to Form a Build Material Layer, the Build Material Composition Including a Polyamide 104 — Based on a 3D Object Model, Selectively Applying a Plasticizer on at least a Portion of the Build Material Layer, the Plasticizer Having:

a Formula (I):

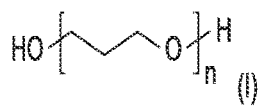

wherein n is an Integer Ranging from 3 to 8; or
a Formula (II):

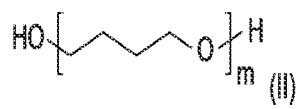

wherein m is an Integer Ranging from 3 to 8

106 — Based On the 3D Object Model, Forming at least a Region of a 3D Object Layer from the at least the Portion of the Build Material Layer

*Fig-2*

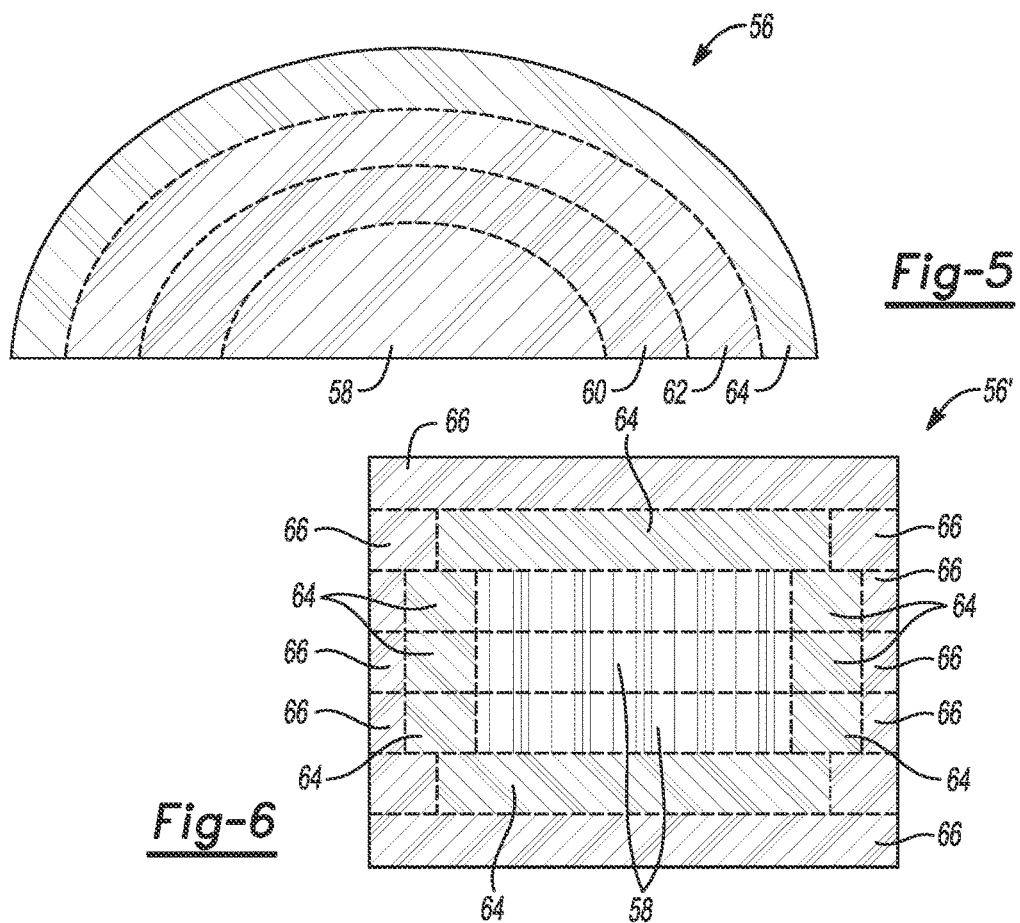
*Fig-5*
*Fig-6*
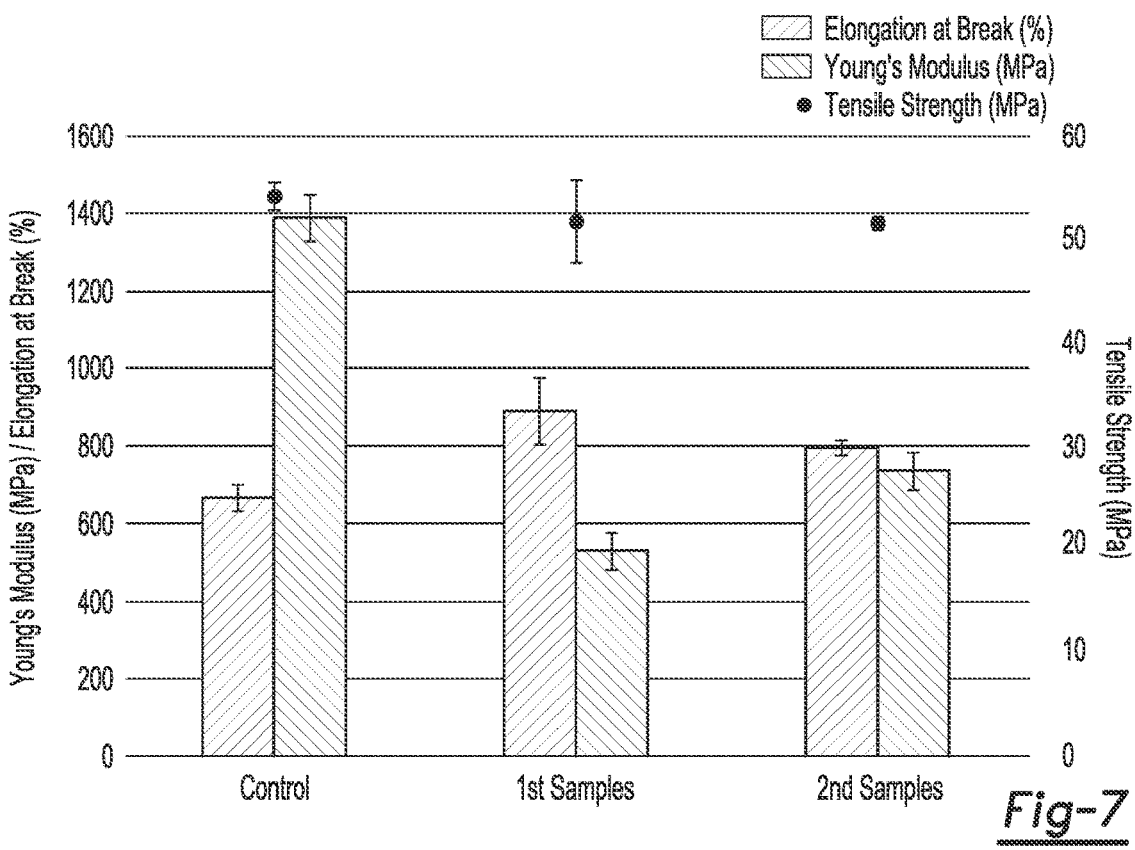
*Fig-7*

THREE-DIMENSIONAL PRINTING

CROSS REFERENCE TO RELATED APPLICATIONS

This application is a continuation of U.S. application Ser. No. 17/047,181, filed Oct. 13, 2020, which itself is a 371 National Stage Entry of International Application No. PCT/US2018/057353, filed on Oct. 24, 2018, the contents of each of which are incorporated herein by reference in their entirety.

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 1A and 1B are schematic diagrams illustrating examples of fluid kits and printing kits for 3D printing;

FIG. 2 is a flow diagram illustrating an example of a method for 3D printing;

FIG. 5 is a cross-sectional view of an example 3D object;

FIG. 6 is a cross-sectional view of another example 3D object;

FIG. 7 is a graph illustrating the elongation at break (%, left Y axis), the Young's Modulus (MPa, left Y axis), and the tensile strength (MPa, right Y axis) of comparative samples, and two different example samples;

DETAILED DESCRIPTION

Figure 4:
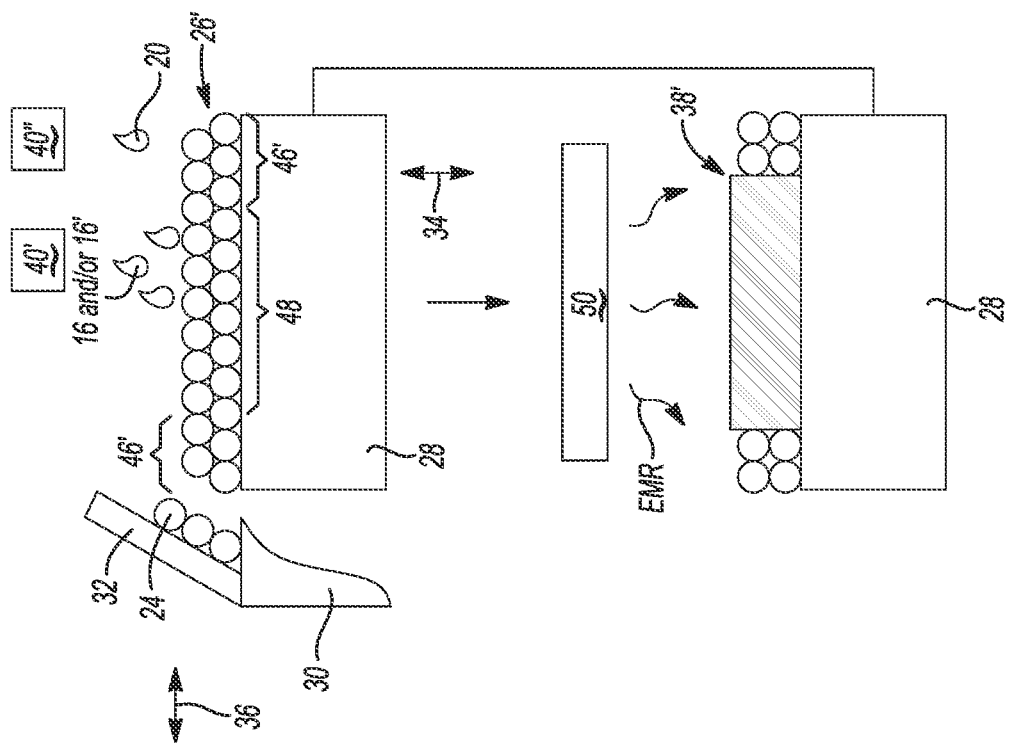
FIG. 4 is a graphic illustration of another example of the method for 3D printing.

Examples of the materials and methods disclosed herein may be used to generate three-dimensionally printed parts with tailored mechanical properties. This is due to the fact that a particular plasticizer is selectively jetted on a build material during the printing process, which imparts the ductility to the particular area(s) of the build material exposed to the plasticizer as the individual layer(s) of the 3D object/part is/are being formed. The ability to jet the plasticizer via any suitable inkjet printing technique enables controlled (and potentially varying) ductility to be introduced at the voxel level.

Some examples of three-dimensional (3D) printing disclosed herein may utilize a fusing agent (including an energy absorber) to pattern polymeric build material. In these examples, an entire layer of the polymeric build material is exposed to radiation, but the patterned region (which, in some instances, is less than the entire layer) of the polymeric build material is coalesced/fused and hardened to become a layer of a 3D object. In the patterned region, the fusing agent is capable of at least partially penetrating into voids between the polymeric build material particles, and is also capable of spreading onto the exterior surface of the polymeric build material particles. This fusing agent is capable of absorbing radiation and converting the absorbed radiation to thermal energy, which in turn coalesces/fuses the polymeric build material that is in contact with the fusing agent. As will be described in further detail herein, in these examples, the plasticizer may be part of a multi-functional fusing agent, or may be applied in a separate agent (referred to herein as an "elasticity agent") along with the fusing agent.

Other examples of 3D printing disclosed herein may utilize selective laser sintering (SLS) or selective laser melting (SLM). During selective laser sintering or melting, a laser beam is aimed at a selected region (which, in some instances, is less than the entire layer) of a layer of the polymeric build material. Heat from the laser beam causes the polymeric build material under the laser beam to fuse. As will be described in further detail herein, in these examples, the plasticizer may be selectively applied at areas that are exposed to the laser beam and where ductility is desired.

Coalescing/fusing (through the use of (i) the fusing agent and radiation exposure, or (ii) the laser beam) causes the polymeric build material to join or blend to form a single entity (i.e., the layer of the 3D object). Coalescing/fusing may involve at least partial thermal merging, melting, binding, and/or some other mechanism that coalesces the polymeric build material to form the layer of the 3D object.

Throughout this disclosure, a weight percentage that is referred to as "wt % active" refers to the loading of an active component of a dispersion or other formulation that is present in the elasticity agent, fusing agent, detailing agent, and/or coloring agent. For example, an energy absorber, such as carbon black, may be present in a water-based formulation (e.g., a stock solution or dispersion) before being incorporated into the fusing liquid. In this example, the wt % actives of the carbon black accounts for the loading (as a weight percent) of the carbon black solids that are present in the fusing agent, and does not account for the weight of the other components (e.g., water, etc.) that are present in the stock solution or dispersion with the carbon black. The term "wt %," without the term actives, refers to either i) the loading (in the elasticity agent, fusing agent, detailing agent, or coloring agent) of a 100% active component that does not include other non-active components therein, or ii) the loading (in the elasticity agent, fusing agent, detailing agent, or coloring agent) of a material or component that is used "as is" and thus the wt % accounts for both active and non-active components.

3D Printing Fluid Kits, 3D Printing Kits, and 3D Printing Compositions

The examples disclosed herein include fluid kits for three-dimensional (3D) printing, three-dimensional (3D) printing kits, and three-dimensional (3D) printing compositions.

Examples of the fluid kits for three-dimensional (3D) printing are shown in FIGS. 1A and 1B. Some examples of the fluid kits 10 (shown in FIG. 1A) include multiple agents 12 and 14, 12 and 14', or 12, 14 and 14' for enhancing energy absorption and imparting ductility. Other examples of the fluid kits 10' (shown in FIG. 1B) include a multi-functional fluid 16 and/or 16' for enhancing energy absorption and imparting ductility. Any of the fluid kits 10, 10' that include more than one agent may be referred to herein as a multi-fluid kit.

As shown in FIG. 1A, the multi-fluid kit 10 includes an elasticity agent 12 to be applied to at least a portion of a build material composition during 3D printing, an elasticity agent 12 including a plasticizer having: a formula (I):

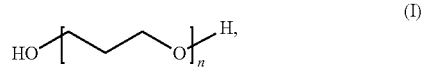

wherein n is an integer ranging from 3 to 8; or a formula (II):

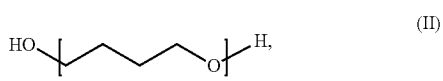

wherein m is an integer ranging from 3 to 8; and a fusing agent 14 and/or 14' to be applied to the at least the portion of the build material composition during 3D printing, the fusing agent 14 and/or 14' including an energy absorber.

As shown in FIG. 1B, the fluid kit 10' includes a multi-functional fusing agent 16 and/or 16'. This fusing agent 16 and/or 16' includes an energy absorber and a plasticizer having: a formula (I):

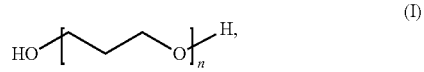

wherein n is an integer ranging from 3 to 8; or a formula (II):

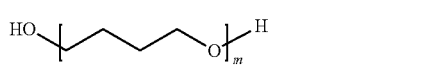

(II) wherein m is an integer ranging from 3 to 8.

In some examples, the multi-fluid kit 10 consists of the elasticity agent 12 and the fusing agent 14 and/or 14' with no other agents. In other examples, the fluid kit 10' consists of the fusing agent 16 and/or 16' with no other agents. However, as depicted in phantom in FIGS. 1A and 1B, other examples of the fluid kids 10, 10' disclosed herein may further include a coloring agent 18 selected from the group consisting of a black agent, a cyan agent, a magenta agent, and a yellow agent; or a detailing agent 20 including a surfactant, a co-solvent, and water; or both the coloring agent 18 and the detailing agent 20.

Any example of the respective fluid kids 10, 10' may also be part of a 3D printing kit and/or composition. FIGS. 1A and 1B illustrate examples of the 3D printing kits 22 and 22'. In addition to the respective fluid kits 10 or 10', the 3D printing kits 22, 22' also include a build material composition 24. More specifically, one example of the 3D printing kit 22, as shown in FIG. 1A, comprises or consists of: a build material composition 24 including a polyamide, the elasticity agent 12, and the fusing agent 14 and/or 14'; and another example of the 3D printing kit 22', as shown in FIG. 1B, comprises or consists of: a build material composition 24 including a polyamide, and the multi-functional fusing agent 16 and/or 16'. Other examples of the 3D printing kits 22, 22' may additionally include the coloring agent 18 and/or the detailing agent 20.

FIG. 1A also illustrates another example of a 3D printing kit 22" (in phantom) that may be particularly useful in SLS or SLM, because these techniques do not utilize a fusing agent. In this example, the 3D printing kit 22" comprises: a build material composition 24 including a polyamide, and the elasticity agent 12 to be applied to at least a portion of the build material composition 24 during 3D printing, the elasticity agent 12 including a plasticizer having: formula (I):

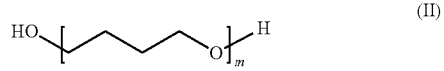

wherein n is an integer ranging from 3 to 8; or formula (II):

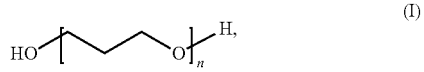

wherein m is an integer ranging from 3 to 8.

It is to be understood that the components of the fluid kits 10, 10' and/or of the 3D printing kits 22, 22', 22" may be maintained separately until used together in examples of the 3D printing method disclosed herein.

As used herein, it is to be understood that the terms "material set" or "kit" may, in some instances, be synonymous with "composition." Further, "material set" and "kit" are understood to be compositions comprising one or more components where the different components in the compositions are each contained in one or more containers, separately or in any combination, prior to and during printing but these components can be combined together during printing. The containers can be any type of a vessel, box, or receptacle made of any material.

As mentioned above, various agents may be included in the fluid kits 10, 10' and/or 3D printing kits 22, 22', 22" disclosed herein. Example compositions of the elasticity agent 12, the fusing agents 14, 14', 16, 16', the coloring agent 18, the detailing agent 18, and the build material composition 24 will now be described.

Elasticity Agent 12

The fluid kit 10 and the 3D printing kits 22, 22" disclosed herein include the elasticity agent 12. The elasticity agent 12 includes the plasticizer. When the elasticity agent 12 is used in a 3D printing process, the plasticizer may impart ductility to the 3D object formed or portion(s) thereof by plasticizing a polyamide (i.e., decreasing the attraction between polymer chains of the polyamide) present in the build material composition 24.

As mentioned above, the plasticizer has formula (I):

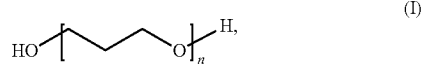

wherein n is an integer ranging from 3 to 8; or the formula (II):

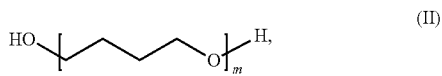

wherein m is an integer ranging from 3 to 8. In some examples of the fluid kit 10 and/or the 3D printing kit 22, 22" or composition, the plasticizer has the formula (I) and wherein n is 4 or 5; or the plasticizer has the formula (II) and wherein m is 5.

In some examples of the fluid kit 10 and/or the 3D printing kit 22, 22" or composition, the plasticizer in the elasticity agent 12 has formula (I). The plasticizer of formula (I) may be characterized as an oligomer of 1,3-propanediol or an oligomer of trimethylene glycol. In a specific example, the plasticizer has the formula (I) and wherein n is 4 or 5. Commercially available examples of the plasticizer having formula (I) include those in the SENSATIS® or VELVETOL® series from Allessa. As particular examples, SENSATIS® H250 is an example of the plasticizer having formula (I), where n is 4 or 5, and VELVETOL® H500 is an example of the plasticizer having formula (I), where n is 8.

In other examples of the fluid kit 10 and/or the 3D printing kit 22, 22" or composition, the plasticizer in the elasticity agent 12 has formula (II). The plasticizer of formula (II) may be characterized as an oligomer of 1,4-butanediol, or an oligomer of tetramethylene glycol, or an oligomer of tetrahydrofuran. In a specific example, the plasticizer has the formula (II) and wherein m is 5. Commercially available examples of the plasticizer having formula (II) include those in the POLYTHF® series from BASF Corp. and those in the POLYMEG® series from LyondellBasell.

In the examples disclosed herein, the plasticizer has a molecular weight ranging from about 192 Daltons (Da) to about 595 Da. In one example, the plasticizer has a molecular weight of about 250 Da. In another example, the plasticizer has a molecular weight of about 380 Da.

Examples of the plasticizer disclosed herein have a viscosity at 25° C. ranging from about 100 mPa·s to about 150 mPa·s. In an example, the plasticizer may have a viscosity at 25° C. of about 120 mPa·s.

Examples of the plasticizer are above a given solubility threshold in a water-based solvent system. This solubility threshold is 20% soluble in water or in a water-based solvent system including at least 25% water (by weight). This viscosity and this solubility enable plasticizer to be present in the elasticity agent at a higher loading than if the plasticizer were, respectively, less soluble and more viscous. This viscosity and this solubility may also contribute to the jettability of the elasticity agent.

In some examples of the fluid kit 10 and/or the 3D printing kit 22, 22' or composition, the plasticizer is present in the elasticity agent 12 in an amount ranging from about 1 wt % to about 35 wt %, based on a total weight of the elasticity agent 12. In one example, the plasticizer is present in the elasticity agent 12 in an amount of about 20 wt %, based on a total weight of the elasticity agent 12. In another example, the plasticizer is present in the elasticity agent 12 in an amount of about 25 wt %, based on a total weight of the elasticity agent 12. In still another example, the plasticizer is present in the elasticity agent 12 in an amount of about 30 wt %, based on a total weight of the elasticity agent 12.

In some examples of the fluid kit 10 and/or the 3D printing kit 22, 22" or composition, the elasticity agent 12 includes a liquid vehicle in addition to the plasticizer. In some of these examples, the elasticity agent 12 consists of the plasticizer and the liquid vehicle. In others of these examples, the elasticity agent 12 may include additional components.

As used herein, the term "liquid vehicle" may refer to the liquid in which the plasticizer is dispersed or dissolved to form the elasticity agent 12. A wide variety of aqueous vehicles may be used in the elasticity agent 12.

In some examples, the liquid vehicle may include water alone with no other components. In other examples, the liquid vehicle may include other components, depending, in part, upon the applicator that is to be used to dispense the elasticity agent 12. Examples of other suitable elasticity agent 12 components include co-solvent(s), humectant(s), surfactant(s), antimicrobial agent(s), anti-kogation agent(s), chelating agent(s) and/or buffer(s).

In an example, the liquid vehicle includes a co-solvent, a surfactant, and a balance of water. In another example, the liquid vehicle consists of a co-solvent, a surfactant, and a balance of water. In still another example, the liquid vehicle consists of a co-solvent, a surfactant, an additive selected from the group consisting of a humectant, an antimicrobial agent, an anti-kogation agent, a chelating agent, a buffer, and a combination thereof, and a balance of water.

Classes of organic co-solvents that may be used in the elasticity agent 12 include aliphatic alcohols, aromatic alcohols, diols, glycol ethers, polyglycol ethers, lactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, 2-pyrrolidone, 1-methyl-2-pyrrolidone, N-(2-hydroxyethyl)-2-pyrrolidone, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Some examples of suitable co-solvents include water-soluble high-boiling point solvents, which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the elasticity agent 12 in a total amount ranging from about 1 wt % to about 50 wt % based upon the total weight of the elasticity agent, depending upon the jetting architecture of the applicator. In an example, the total amount of the co-solvent(s) present in the elasticity agent 12 is about 5 wt % based on the total weight of the elasticity agent 12. In another example, the total amount of the co-solvent(s) present in the elasticity agent 12 is about 20 wt % based on the total weight of the elasticity agent 12.

The liquid vehicle may also include humectant(s). In an example, the total amount of the humectant(s) present in the elasticity agent 12 ranges from about 3 wt % active to about 10 wt % active, based on the total weight of the elasticity agent 12. An example of a suitable humectant is ethoxylated glycerin having the following formula:

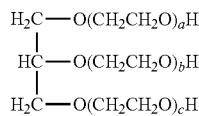

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals).

In some examples, the liquid vehicle includes surfactant(s) to improve the jettability of the elasticity agent 12. Examples of suitable surfactants include a self-emulsifiable, non-ionic wetting agent based on acetylenic diol chemistry (e.g., SURFYNOL® SEF from Evonik Degussa), a non-ionic fluorosurfactant (e.g., CAPSTONE® fluorosurfactants, such as CAPSTONE® FS-35, from Chemours), and combinations thereof. In other examples, the surfactant is an ethoxylated low-foam wetting agent (e.g., SURFYNOL® 440 or SURFYNOL® CT-111 from Evonik Degussa) or an ethoxylated wetting agent and molecular defoamer (e.g., SURFYNOL® 420 from Evonik Degussa). Still other suitable surfactants include non-ionic wetting agents and molecular defoamers (e.g., SURFYNOL® 104E from Evonik Degussa) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (polyether siloxane) available from Evonik Degussa). Yet another suitable surfactant includes alkyldiphenyloxide disulfonate (e.g., the DOWFAX™ series, such a 2A1, 3B2, 8390, C6L, C10L, and 30599, from The Dow Chemical Company).

Whether a single surfactant is used or a combination of surfactants is used, the total amount of surfactant(s) in the elasticity agent 12 may range from about 0.01 wt % active to about 10 wt % active based on the total weight of the elasticity agent 12. In an example, the total amount of surfactant(s) in the elasticity agent 12 may be about 0.75 wt % active based on the total weight of the elasticity agent 12.

An anti-kogation agent may be included in the elasticity agent 12 that is to be jetted using thermal inkjet printing. Kogation refers to the deposit of dried printing liquid (e.g., elasticity agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS® O3A or CRODAFOS® N-3 acid from Croda), dextran 500k, CRODAFOS™ HCE (phosphate-ester from Croda Int.), CRODAFOS® N10 (oleth-10-phosphate from Croda Int.), DISPERSOGEN® LFH (polymeric dispersing agent with aromatic anchoring groups, acid form, anionic, from Clariant), or a combination of oleth-3-phosphate and a low molecular weight (e.g., <5,000) acrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the elasticity agent 12 may range from greater than 0.10 wt % active to about 1.5 wt % active based on the total weight of the elasticity agent 12. In an example, the oleth-3-phosphate is included in an amount ranging from about 0.45 wt % active.

The liquid vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the elasticity agent 12 may include a total amount of antimicrobial agents that ranges from about 0.0001 wt % active to about 1 wt % active. In an example, the antimicrobial agent(s) is/are a biocide(s) and is/are present in the elasticity agent in an amount of about 0.18 wt % active (based on the total weight of the elasticity agent 12).

Chelating agents (or sequestering agents) may be included in the liquid vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the elasticity agent 12 may range from greater than 0 wt % active to about 2 wt % active based on the total weight of the elasticity agent 12. In an example, the chelating agent(s) is/are present in the elasticity agent 12 in an amount of about 0.08 wt % active (based on the total weight of the elasticity agent 12).

The liquid vehicle may also include buffer(s). Examples of buffers include TRIS (tris(hydroxymethyl)aminomethane or TRIZMA®), bis-tris propane, TES (2-[(2-Hydroxy-1,1-bis(hydroxymethyl)ethyl)amino]ethanesulfonic acid), MES (2-ethanesulfonic acid), MOPS (3-(N-morpholino)propanesulfonic acid), HEPES (4-(2-hydroxyethyl)-1-piperazineethanesulfonic acid), DIPSO (3-(N,N-Bis[2-hydroxyethyl]amino)-2-hydroxypropanesulfonic acid), Tricine (N-

[tris(hydroxymethyl)methyl]glycine), HEPPSO (β-Hydroxy-4-(2-hydroxyethyl)-1-piperazinepropanesulfonic acid monohydrate), POPSO (Piperazine-1,4-bis(2-hydroxypropanesulfonic acid) dihydrate), EPPS (4-(2-Hydroxyethyl)-1-piperazinepropanesulfonic acid, 4-(2-Hydroxyethyl)piperazine-1-propanesulfonic acid), TEA (triethanolamine buffer solution), Gly-Gly (Diglycine), bicine (N,N-Bis(2-hydroxyethyl)glycine), HEPBS (N-(2-Hydroxyethyl)piperazine-N'-(4-butanesulfonic acid)), TAPS ([tris(hydroxymethyl)methylamino]propanesulfonic acid), AMPD (2-amino-2-methyl-1,3-propanediol), TABS (N-tris (Hydroxymethyl)methyl-4-aminobutanesulfonic acid), or the like.

Whether a buffer is used or a combination of buffers is used, the total amount of buffer(s) in the elasticity agent 12 may range from greater than 0 wt % active to about 0.5 wt % active based on the total weight of the elasticity agent. In an example, the buffer(s) is/are present in the elasticity agent 12 in an amount of about 0.1 wt % active (based on the total weight of the elasticity agent 12).

The balance of the elasticity agent 12 is water. As such, the amount of water may vary depending upon the amounts of the other components that are included. In an example, deionized water may be used.

In some examples, the elasticity agent is jettable via thermal inkjet printing, piezoelectric inkjet printing, continuous inkjet printing, or a combination thereof. As such, the liquid vehicle components may be selected to achieve the desired jettability. For example, if the elasticity agent 12 is to be jettable via thermal inkjet printing, water may make up 35 wt % or more of the elasticity agent 12. For another example, if the elasticity agent is to be jettable via piezoelectric inkjet printing, water may make up from about 25 wt % to about 30 wt % of the elasticity agent 12, and 35 wt % or more of the elasticity agent may be ethanol, isopropanol, acetone, etc.

Fusing Agents

As mentioned herein, different examples of the fusing agent 14, 14', 16, 16' may be used in the fluid kits 10, 10' and 3D printing kits 22, 22' disclosed herein.

Some examples of the fusing agent 14, 16 have substantial absorption (e.g., 80%) at least in the visible region (400 nm-780 nm). These examples of the fusing agent 14, 16 are referred to as the core fusing agent, or, in some instances, the black fusing agent. As described herein, the energy absorber in the core fusing agent 14, 16 may also absorb energy in the infrared region (e.g., 800 nm to 4000 nm). This absorption generates heat suitable for coalescing/fusing the build material composition 24 in contact therewith during 3D printing, which leads to 3D objects (or 3D objects regions) having mechanical integrity and relatively uniform mechanical properties (e.g., strength, elongation at break, etc.). This absorption, however, also results in strongly colored, e.g., black, 3D objects (or 3D objects regions). In these examples of the fusing agent 14, 16, the energy absorber may be referred to as the active material.

Other examples of the fusing agent 14', 16' include an energy absorber having absorption at wavelengths ranging from 800 nm to 4000 nm and having transparency at wavelengths ranging from 400 nm to 780 nm. These examples of the fusing agent 14', 16' are referred to as the primer fusing agent, or, in some instances, the low tint fusing agent. This absorption and transparency allows the primer fusing agent 14', 16' to absorb enough radiation to coalesce/fuse the build material composition 24 in contact therewith while causing the 3D objects (or 3D objects regions) to be white or slightly colored.

As used herein "absorption" means that at least 80% of radiation having wavelengths within the specified range is absorbed. Also used herein, "transparency" means that 25% or less of radiation having wavelengths within the specified range is absorbed.

Core Fusing Agents 14, 16

Some examples of the core fusing agent 14, 16 are dispersions including an energy absorber (i.e., an active material). In some examples, the active material may be an infrared light absorbing colorant. In an example, the active material is a near-infrared light absorber. Any near-infrared colorants, e.g., those produced by Fabricolor, Eastman Kodak, or BASF, Yamamoto, may be used in the core fusing agent 14, 16. As one example, the core fusing agent 14, 16 may be a printing liquid formulation including carbon black as the active material. Examples of this printing liquid formulation are commercially known as CM997A, 516458, C18928, C93848, C93808, or the like, all of which are available from HP Inc.

As another example, the core fusing agent 14, 16 may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

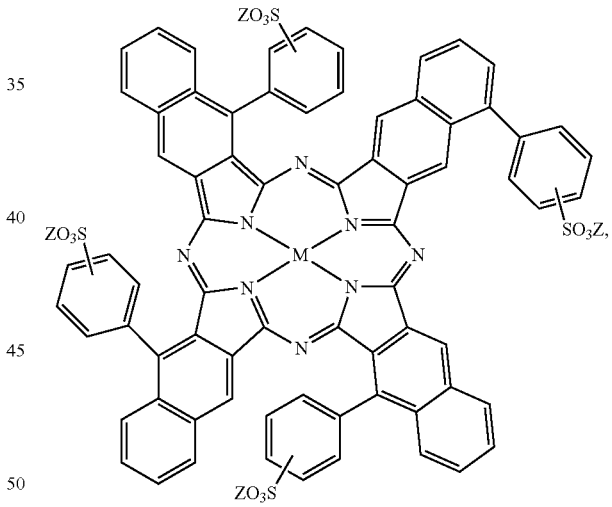

-continued

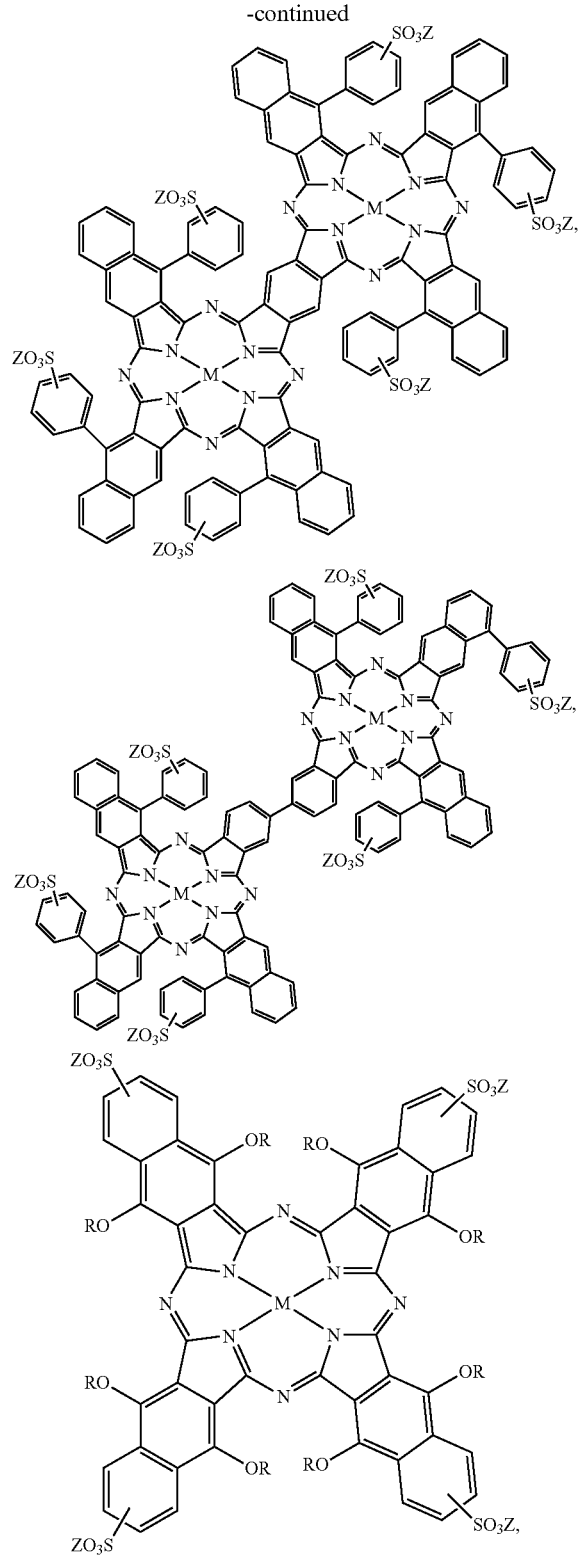

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

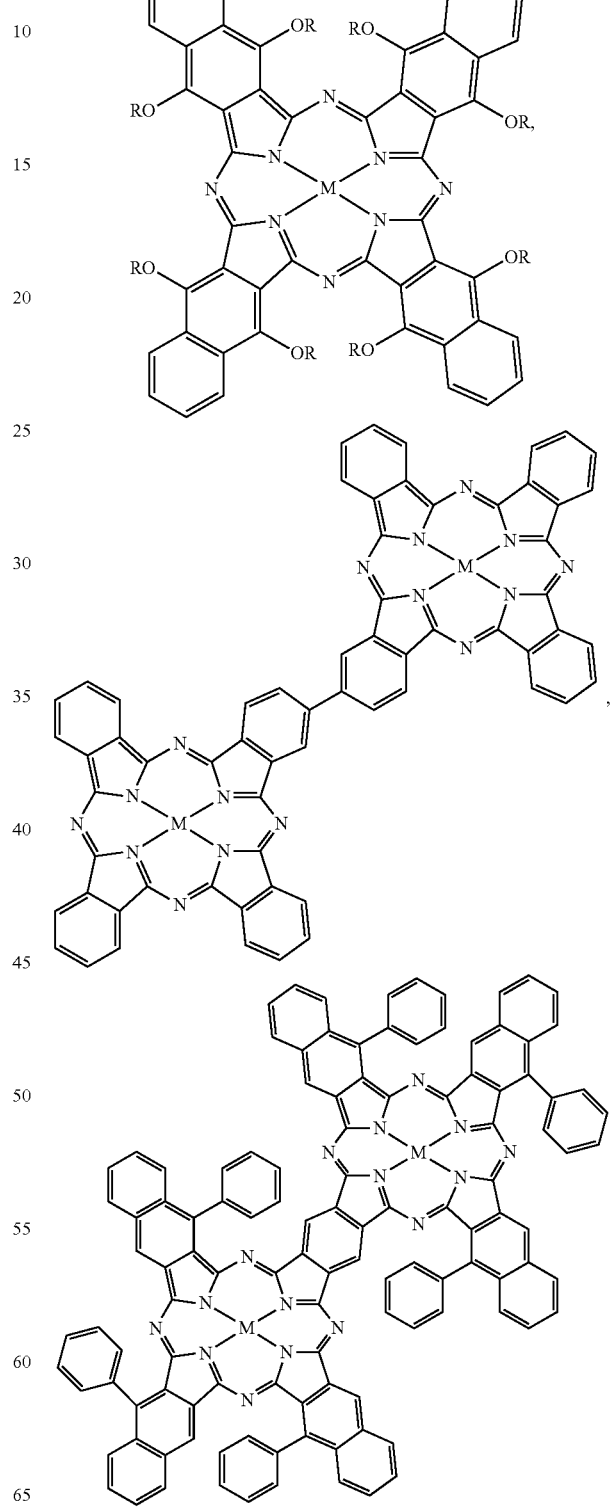

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used. Some examples include anthroquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthroquinone dyes or pigments and metal (e.g., nickel) dithiolene dyes or pigments may have the following structures, respectively:

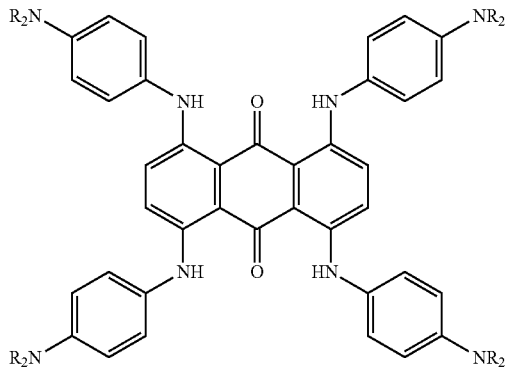

Anthroquinone dyes/pigments

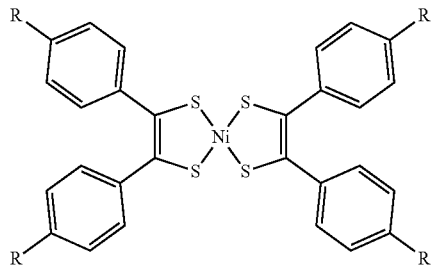

Nickel Dithiolene dyes/pigments where R in the anthroquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

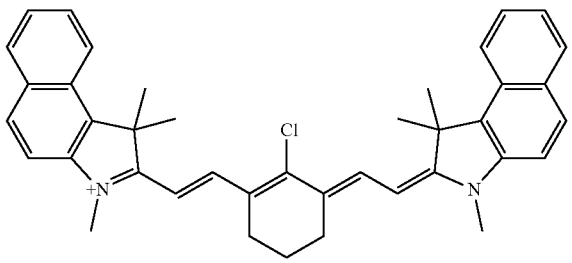

Cyanine dyes/pigments

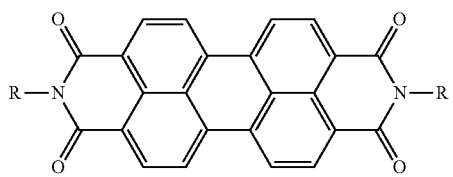

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

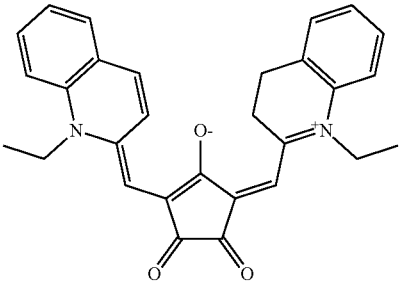

Croconium dyes/pigments

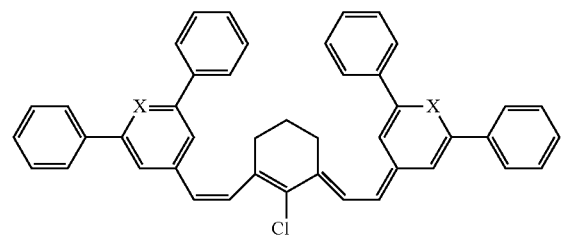

Pyrilium (X=O), thiopyrilium (X=S) dyes/pigments

Boron-dipyrromethene dyes or pigments and aza-boron-dipyrromethene dyes or pigments may have the following structures, respectively:

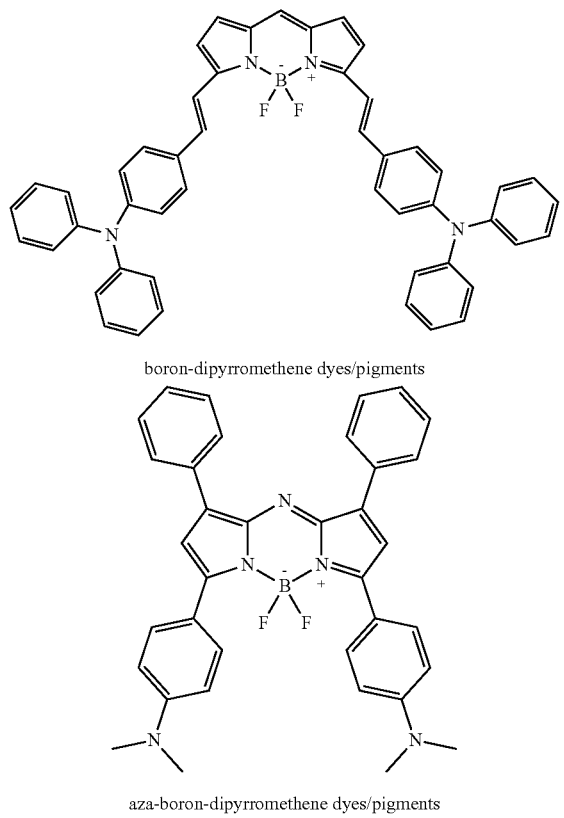

boron-dipyrromethene dyes/pigments aza-boron-dipyrromethene dyes/pigments

The amount of the active material that is present in the core fusing agent 14, 16 ranges from greater than 0 wt % active to about 40 wt % active based on the total weight of the core fusing agent 14, 16. In other examples, the amount of the active material in the core fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these active material loadings provide a balance between the core fusing agent 14, 16 having jetting reliability and heat and/or radiation absorbance efficiency.

Primer Fusing Agents 14', 16'

Some examples of the primer fusing agent 14', 16' are dispersions including the energy absorber that has absorption at wavelengths ranging from 800 nm to 4000 nm and transparency at wavelengths ranging from 400 nm to 780 nm. The absorption of this energy absorber is the result of plasmonic resonance effects. Electrons associated with the atoms of the energy absorber may be collectively excited by radiation, which results in collective oscillation of the electrons. The wavelengths that can excite and oscillate these electrons collectively are dependent on the number of electrons present in the energy absorber particles, which in turn is dependent on the size of the energy absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the primer fusing agent to be inkjet jettable as well as electromagnetically selective (e.g., having absorption at wavelengths ranging from 800 nm to 4000 nm and transparency at wavelengths ranging from 400 nm to 780 nm).

In an example, the energy absorber of the primer fusing agent 14', 16' has an average particle diameter (e.g., volume-weighted mean diameter) ranging from greater than 0 nm to less than 220 nm. In another example, the energy absorber has an average particle diameter ranging from greater than 0 nm to 120 nm. In a still another example, the energy absorber has an average particle diameter ranging from about 10 nm to about 200 nm.

In an example, the energy absorber of the primer fusing agent 14', 16' is an inorganic pigment. Examples of suitable inorganic pigments include lanthanum hexaboride ($LaB_6$), tungsten bronzes ($A_xWO_3$), indium tin oxide ($In_2O_3{:}SnO_2$, ITO), antimony tin oxide ($Sb_2O_3{:}SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the energy absorber that is present in the primer fusing agent 14', 16' ranges from greater than 0 wt % active to about 40 wt % active based on the total weight of the primer fusing agent 14', 16'. In other examples, the amount of the energy absorber in the primer fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these energy absorber loadings provide a balance between the primer fusing agent 14', 16' having jetting reliability and heat and/or radiation absorbance efficiency.

The energy absorber of the primer fusing agent 14', 16' may, in some instances, be dispersed with a dispersant. As such, the dispersant helps to uniformly distribute the energy absorber throughout the primer fusing agent 14', 16'. Examples of suitable dispersants include polymer or small molecule dispersants, charged groups attached to the energy absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the primer fusing agent 14', 16' may range from about 10 wt % to about 200 wt % based on the weight of the energy absorber in the primer fusing agent 14', 16'.

A silane coupling agent may also be added to the primer fusing agent 14', 16' to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the primer fusing agent 14', 16' may range from about 0.1 wt % to about 50 wt % based on the weight of the energy absorber in the primer fusing agent 14', 16'. In an example, the total amount of silane coupling agent(s) in the primer fusing agent 14', 16' ranges from about 1 wt % to about 30 wt % based on the weight of the energy absorber. In another example, the total amount of silane coupling agent(s) in the primer fusing agent 14', 16' ranges from about 2.5 wt % to about 25 wt % based on the weight of the energy absorber.

One example of the primer fusing agent 14', 16' includes cesium tungsten oxide (CTO) nanoparticles as the energy absorber. The CTO nanoparticles have a formula of $Cs_xWO_3$, where $0<x<1$. The cesium tungsten oxide nanoparticles may give the primer fusing agent a light blue color. The strength of the color may depend, at least in part, on the amount of the CTO nanoparticles in the primer fusing agent 14', 16'. When it is desirable to form an outer white layer on the 3D object, less of the CTO nanoparticles may be used in the primer fusing agent in order to achieve the white color. In an example, the CTO nanoparticles may be present in the primer fusing agent 14', 16' in an amount ranging from about 1 wt % to about 20 wt % (based on the total weight of the primer fusing agent 14', 16').

The average particle size (e.g., volume-weighted mean diameter) of the CTO nanoparticles may range from about 1 nm to about 40 nm. In some examples, the average particle size of the CTO nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

This example of the primer fusing agent 14', 16' may also include a zwitterionic stabilizer. The zwitterionic stabilizer may improve the stabilization of this example of the primer fusing agent 14', 16'. While the zwitterionic stabilizer has an overall neutral charge, at least one area of the molecule has a positive charge (e.g., amino groups) and at least one other area of the molecule has a negative charge. The CTO nanoparticles may have a slight negative charge. The zwitterionic stabilizer molecules may orient around the slightly negative CTO nanoparticles with the positive area of the zwitterionic stabilizer molecules closest to the CTO nanoparticles and the negative area of the zwitterionic stabilizer molecules furthest away from the CTO nanoparticles. Then, the negative charge of the negative area of the zwitterionic stabilizer molecules may repel CTO nanoparticles from each other. The zwitterionic stabilizer molecules may form a protective layer around the CTO nanoparticles, and prevent them from coming into direct contact with each other and/or increase the distance between the particle surfaces (e.g., by a distance ranging from about 1 nm to about 2 nm). Thus, the zwitterionic stabilizer may prevent the CTO nanoparticles from agglomerating and/or settling in the primer fusing agent 14', 16'.

Examples of suitable zwitterionic stabilizers include $C_2$ to $C_8$ betaines, $C_2$ to $C_8$ aminocarboxylic acids having a solubility of at least 10 g in 100 g of water, taurine, and combinations thereof. Examples of the $C_2$ to $C_8$ aminocarboxylic acids include beta-alanine, gamma-aminobutyric acid, glycine, and combinations thereof.

The zwitterionic stabilizer may be present in the primer fusing agent in an amount ranging from about 2 wt % to about 35 wt % (based on the total weight of the primer fusing agent). When the zwitterionic stabilizer is the $C_2$ to $C_8$ betaine, the $C_2$ to $C_8$ betaine may be present in an amount ranging from about 8 wt % to about 35 wt % of the total weight of the primer fusing agent 14', 16'. When the zwitterionic stabilizer is the $C_2$ to $C_8$ aminocarboxylic acid, the $C_2$ to $C_8$ aminocarboxylic acid may be present in an amount ranging from about 2 wt % to about 20 wt % of the total weight of the primer fusing agent 14', 16'. When the zwitterionic stabilizer is taurine, taurine may be present in an amount ranging from about 2 wt % to about 35 wt % of the total weight of the primer fusing agent 14', 16'.

In this example, the weight ratio of the CTO nanoparticles to the zwitterionic stabilizer may range from 1:10 to 10:1; or the weight ratio of the CTO nanoparticles to the zwitterionic stabilizer may be 1:1.

Multi-Functional Fusing Agents 16, 16'

In addition to the respective energy absorbers described herein, the fusing agents 16 or 16' also include an example of the plasticizer. As will be discussed further in reference to the method shown in FIG. 4, the fusing agents 16 or 16' may be used without the elasticity agent 12 because the plasticizer is incorporated directly into the fusing agent 16, 16'.

It is to be understood that when the plasticizer is included in the fusing agent 16, 16', any example of the plasticizer set forth herein for the elasticity agent 12 may be used. More specifically, when the plasticizer is included in the fusing agent 16, 16', the plasticizer may have formula (I):

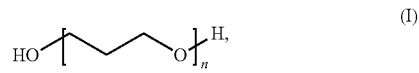

wherein n is an integer ranging from 3 to 8; or the the plasticizer may have formula (II):

wherein m is an integer ranging from 3 to 8.

As such, in some examples of the fluid kit 10' and/or the 3D printing kit 22' or composition (FIG. 1B), the plasticizer in the fusing agent 16 or 16' has formula (I) or formula (II). In a specific example, the plasticizer in the fusing agent 16 or 16' has the formula (I) and wherein n is 4 or 5, or the plasticizer in the fusing agent 16 or 16' has the formula (II) and wherein m is 5.

In some examples of the fluid kit 10' and/or the 3D printing kit 22" or composition, the plasticizer is present in the fusing agent 16 or 16' in an amount ranging from about 1 wt % to about 35 wt %, based on a total weight of the fusing agent 16 or 16'.

Vehicle for Fusing Agents 14, 14', 16, 16'

Any example of the fusing agent 14, 14' (without plasticizer incorporated therein) or the fusing agent 16, 16' (with plasticizer incorporated therein) includes a liquid vehicle.

The fusing agent vehicle, or "FA vehicle," may refer to the liquid in which the energy absorber (for agents 14, 14') or the energy absorber and plasticizer (for agents 16, 16') is/are dispersed or dissolved to form the respective fusing agent 14, 14', 16, 16'. A wide variety of FA vehicles, including aqueous and non-aqueous vehicles, may be used in the fusing agent 14, 14', 16, 16'. In some examples, the FA vehicle may include water alone or a non-aqueous solvent alone with no other components. In other examples, the FA vehicle may include other components, depending, in part, upon the applicator that is to be used to dispense the fusing agent. Examples of other suitable fusing agent components include co-solvent(s), humectant(s), surfactant(s), antimicrobial agent(s), anti-kogation agent(s), and/or chelating agent(s).

It is to be understood that any of the include co-solvent(s), humectant(s), surfactant(s), antimicrobial agent(s), anti-kogation agent(s), and/or chelating agent(s) described herein for the elasticity agent 12 may be used in any examples of the fusing agent 14, 14', 16, 16' in any of the amounts provided, except that the percentages will be with respect to the total weight of the fusing agent 14, 14', 16, 16'.

Coloring Agent 18

In any the examples of the fluid kits 10, 10', the 3D printing kits 22, 22', 22", and the 3D printing compositions disclosed herein, a coloring agent 18 may be used. The coloring agent 18 may include a colorant, a co-solvent, and a balance of water. In some examples, the coloring agent 18 consists of these components, and no other components. In some other examples, the coloring agent 18 may further include a binder (e.g., an acrylic latex binder, which may be a copolymer of any two or more of styrene, acrylic acid, methacrylic acid, methyl methacrylate, ethyl methacrylate, and butyl methacrylate) and/or a buffer. In still other examples, the coloring agent 18 may further include additional components, such as dispersant(s), humectant(s), surfactant(s), anti-kogation agent(s), antimicrobial agent(s), and/or chelating agent(s) (each of which is described above in reference to the elasticity agent 12 or the fusing agent 14, 14', 16, 16').

The coloring agent 18 may be a black agent, a cyan agent, a magenta agent, or a yellow agent. As such, the colorant may be a black colorant, a cyan colorant, a magenta colorant, a yellow colorant, or a combination of colorants that together achieve a black, cyan, magenta, or yellow color.

In some instances, the colorant of the coloring agent 18 may be transparent to infrared wavelengths. In other instances, the colorant of the coloring agent 18 may not be completely transparent to infrared wavelengths, but does not absorb enough radiation to sufficiently heat the build material composition 24 in contact therewith. In an example, the colorant absorbs less than 10% of radiation having wavelengths in a range of 650 nm to 2500 nm. In another example, the colorant absorbs less than 20% of radiation having wavelengths in a range of 650 nm to 4000 nm.

The colorant of the coloring agent 18 is also capable of absorbing radiation with wavelengths of 650 nm or less. As such, the colorant absorbs at least some wavelengths within the visible spectrum, but absorbs little or no wavelengths within the near-infrared spectrum. This is in contrast to at least some examples of the energy absorber in the fusing agent 14, 14', 16, 16', which absorb wavelengths within the near-infrared spectrum and/or the infrared spectrum (e.g., the fusing agent 14, 14', 16, 16' absorbs 80% or more of radiation with wavelengths within the near-infrared spectrum and/or the infrared spectrum). As such, the colorant in the coloring agent 18 will not substantially absorb the fusing radiation, and thus will not initiate coalescing/fusing of the build material composition 24 in contact therewith when the build material composition 24 is exposed to the fusing radiation.

Examples of IR transparent colorants include acid yellow 23 (AY 23), AY 17, acid red 52 (AR 52), AR 289, and reactive red 180 (RR 180). Examples of colorants that absorb some visible wavelengths and some IR wavelengths include cyan colorants, such as direct blue 199 (DB 199) and pigment blue 15:3 (PB 15:3).

In other examples, the colorant may be any azo dye having sodium or potassium counter ion(s) or any diazo (i.e., double azo) dye having sodium or potassium counter ion(s).

Examples of black dyes may include tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of:

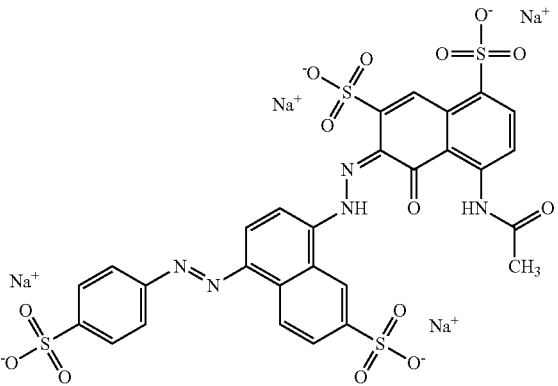

(commercially available as Food Black 1); tetrasodium 6-amino-4-hydroxy-3-[[7-sulfonato-4-[(4-sulfonatophenyl)azo]-1-naphthyl]azo]naphthalene-2,7-disulfonate with a chemical structure of:

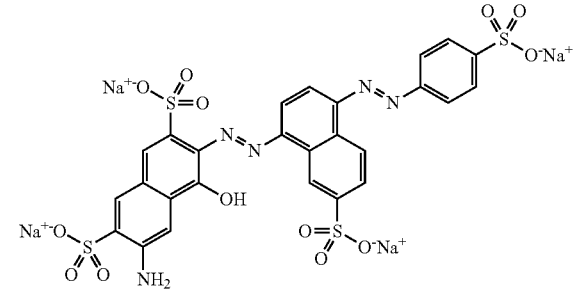

(commercially available as Food Black 2); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

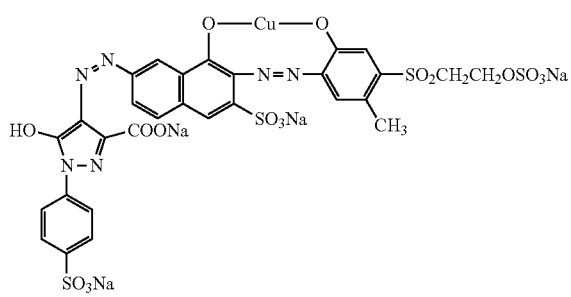

(commercially available as Reactive Black 31); tetrasodium (6E)-4-amino-5-oxo-3-[[4-(2-sulfonatooxyethylsulfonyl) phenyl]diazenyl]-6-[[4-(2-sulfonatooxyethylsulfonyl)phenyl]hydrazinylidene]naphthalene-2,7-disulfonate with a chemical structure of:

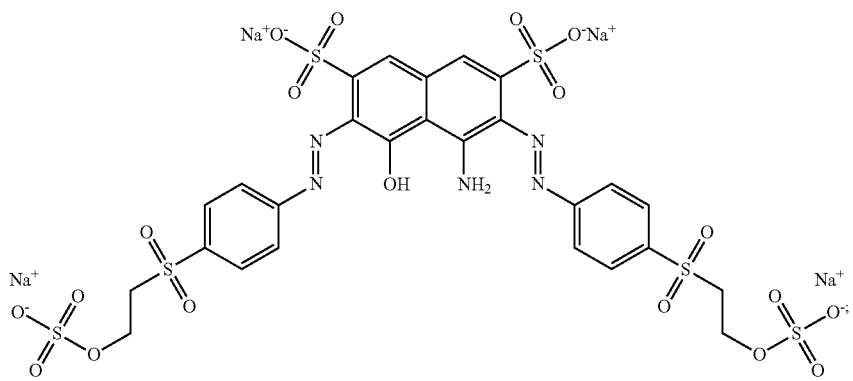

and combinations thereof. Some other commercially available examples of black dyes include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

Examples of cyan dyes include ethyl-[4-[[4-[ethyl-[(3-sulfophenyl) methyl] amino] phenyl]-(2-sulfophenyl) ethylidene]-1-cyclohexa-2,5-dienylidene]-[(3-sulfophenyl) methyl] azanium with a chemical structure of:

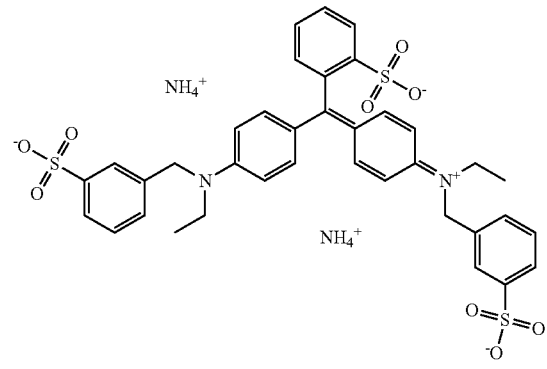

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

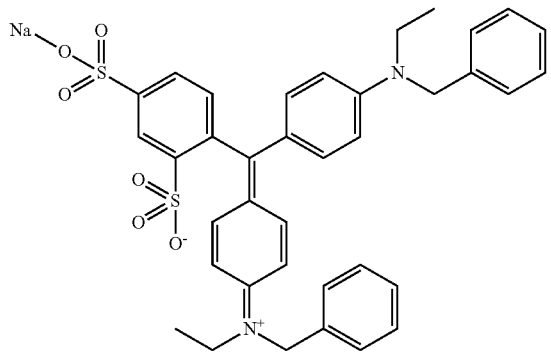

(commercially available as Acid Blue 7); and a phthalocyanine with a chemical structure of:

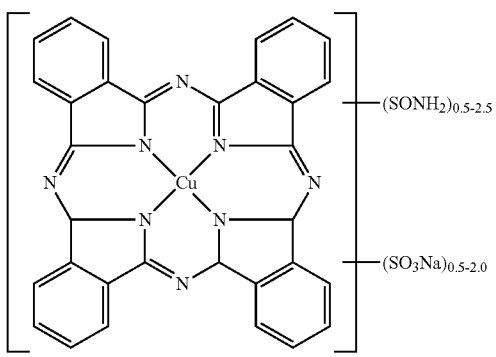

(commercially available as Direct Blue 199); and combinations thereof.

An example of the pigment based coloring agent may include from about 1 wt % to about 10 wt % of pigment(s), from about 10 wt % to about 30 wt % of co-solvent(s), from about 1 wt % to about 10 wt % of dispersant(s), from about 0.1 wt % to about 5 wt % of binder(s), from 0.01 wt % to about 1 wt % of anti-kogation agent(s), from about 0.05 wt % to about 0.1 wt % antimicrobial agent(s), and a balance of water. An example of the dye based coloring agent may include from about 1 wt % to about 7 wt % of dye(s), from about 10 wt % to about 30 wt % of co-solvent(s), from about 1 wt % to about 7 wt % of dispersant(s), from about 0.05 wt % to about 0.1 wt % antimicrobial agent(s), from 0.05 wt % to about 0.1 wt % of chelating agent(s), from about 0.005 wt % to about 0.2 wt % of buffer(s), and a balance of water.

Some examples of the coloring agent 18 include a set of cyan, magenta, and yellow agents, such as C1893A (cyan), C1984A (magenta), and C1985A (yellow); or C4801A (cyan), C4802A (magenta), and C4803A (yellow); all of which are available from HP Inc. Other commercially available coloring agents 18 include C9384A (printhead HP 72), C9383A (printhead HP 72), C4901A (printhead HP 940), and C4900A (printhead HP 940).

Detailing Agent 20

In any the examples of the fluid kits 10, 10', the 3D printing kits 22, 22', 22", and the 3D printing compositions disclosed herein, a detailing agent 20 may be used.

The detailing agent 20 may include a surfactant, a co-solvent, and a balance of water. In some examples, the detailing agent 20 consists of these components, and no other components. In some other examples, the detailing agent 18 may further include additional components, such as humectant(s), anti-kogation agent(s), antimicrobial agent(s), and/or chelating agent(s) (each of which is described above in reference to the elasticity agent 12).

The surfactant(s) that may be used in the detailing agent 20 include any of the surfactants listed above in reference to the elasticity agent 12. The total amount of surfactant(s) in the detailing agent 20 may range from about 0.10 wt % active to about 5.00 wt % active with respect to the total weight of the detailing agent 20.

The co-solvent(s) that may be used in the detailing agent 20 include any of the co-solvents listed above in reference to the elasticity agent 12. The total amount of co-solvent(s) in the detailing agent 20 may range from about 1.00 wt % to about 20.00 wt % with respect to the total weight of the detailing agent 20. Similar to the elasticity agent 12 and/or the fusing agents 14, 14', 16, 16', the co-solvent(s) of the detailing agent 20 may depend, in part upon the jetting technology that is to be used to dispense the detailing agent.

For example, if thermal inkjet printheads are to be used, water and/or ethanol and/or other longer chain alcohols (e.g., pentanol) may make up 35 wt % or more of the detailing agent 20. For another example, if piezoelectric inkjet printheads are to be used, water may make up from about 25 wt % to about 30 wt % of the detailing agent, and 35 wt % or more of the detailing agent 20 may be ethanol, isopropanol, acetone, etc.

The balance of the detailing agent 20 is water. As such, the amount of water may vary depending upon the amounts of the other components that are included.

While the example detailing agent 20 described herein does not include a colorant, it is to be understood that any of the colorants described for the coloring agent 18 (i.e., transparent to infrared wavelengths) may be used in the detailing agent 20. As one example, it may be desirable to add color to the detailing agent 20 when the detailing agent 20 is applied to the edge of a colored part. Color in the detailing agent 20 may be desirable when used at a part edge because some of the colorant may become embedded in the build material 24 that fuses/coalesces at the edge.

Build Material Composition 24

Any of the example 3D printing kits 22, 22', 22" may include the build material composition 24, which includes a polyamide.

The polyamide may be polyamide 12 (PA 12/nylon 12) or polyamide 6 (PA 6/nylon 6). Other polyamides may be suitable for use in the build material composition 24 if the mechanical properties of the polyamide can be altered by the plasticizer disclosed herein.

In some examples, the polyamide may be in the form of a powder. In other examples, the polyamide may be in the form of a powder-like material, which includes, for example, short fibers having a length that is greater than its width. In some examples, the powder or powder-like material may be formed from, or may include, short fibers that may, for example, have been cut into short lengths from long strands or threads of material.

The polyamide may be made up of similarly sized particles and/or differently sized particles. In an example, the average particle size of the polyamide ranges from about 2 µm to about 200 µm. In another example, the average particle size of the polyamide ranges from about 10 µm to about 110 µm. In still another example, the average particle size of the polyamide ranges from about 20 µm to about 100 µm. The term "average particle size", as used herein, may refer to a number-weighted mean diameter or a volume-weighted mean diameter of a particle distribution.

The polyamide may have a wide processing window of greater than 5° C., which can be defined by the temperature range between the melting point and the re-crystallization temperature. In some examples, the polyamide may have a melting point ranging from about 170° C. to about 220° C. In an example, the polyamide may have a melting point within the range of from about 178° C. to about 180° C.

The polyamide does not substantially absorb radiation having a wavelength within the range of 400 nm to 1400 nm. In other examples, the polyamide does not substantially absorb radiation having a wavelength within the range of 800 nm to 1400 nm. In these examples, the polyamide may be considered to reflect the wavelengths at which the polyamide does not substantially absorb radiation. The phrase "does not substantially absorb" means that the absorptivity of the polyamide at a particular wavelength is 25% or less (e.g., 20%, 10%, 5%, etc.).

In some examples, the build material composition 24 consists of the polyamide with no other components. In other examples, the build material composition 24 may include additional components, such as an antioxidant, a whitener, an antistatic agent, a flow aid, or a combination thereof. While several examples of these additives are provided, it is to be understood that these additives are selected to be thermally stable (i.e., will not decompose) at the 3D printing temperatures.

Antioxidant(s) may be added to the build material composition 24 to prevent or slow molecular weight decreases of the polyamide and/or may prevent or slow discoloration (e.g., yellowing) of the polyamide by preventing or slowing oxidation of the polyamide. In some examples, the antioxidant may discolor upon reacting with oxygen, and this discoloration may contribute to the discoloration of the build material composition 24. The antioxidant may be selected to minimize this discoloration. In some examples, the antioxidant may be a radical scavenger. In these examples, the antioxidant may include IRGANOX® 1098 (benzenepropanamide, N,N-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 μm or less) that are dry blended with the polyamide. In an example, the antioxidant may be included in the build material composition 24 in an amount ranging from about 0.01 wt % to about 5 wt %, based on the total weight of the build material composition 24. In other examples, the antioxidant may be included in the build material composition 24 in an amount ranging from about 0.01 wt % to about 2 wt % or from about 0.2 wt % to about 1 wt %, based on the total weight of the build material composition 24.

Whitener(s) may be added to the build material composition 24 to improve visibility. Examples of suitable whiteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), boron nitride (BN), and combinations thereof. In some examples, a stilbene derivative may be used as the whitener and a brightener. In these examples, the temperature(s) of the 3D printing process may be selected so that the stilbene derivative remains stable (i.e., the 3D printing temperature does not thermally decompose the stilbene derivative). In an example, any example of the whitener may be included in the build material composition 24 in an amount ranging from greater than 0 wt % to about 10 wt %, based on the total weight of the build material composition 24.

Antistatic agent(s) may be added to the build material composition 24 to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE 2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the build material composition 24.

Flow aid(s) may be added to improve the coating flowability of the build material composition 24. Flow aids may be particularly beneficial when the build material composition has an average particle size less than 25 μm. The flow aid improves the flowability of the build material composition by reducing the friction, the lateral drag, and the tribocharge buildup (by increasing the particle conductivity). Examples of suitable flow aids include aluminum oxide ($Al_2O_3$), tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the build material composition 24.

In some examples, the build material composition 24 disclosed herein may be reused/recycled. After a print cycle, some of the build material composition 24 disclosed herein remains non-coalesced/non-fused, and can be reclaimed and used again. This reclaimed build material is referred to as the recycled build material composition. The recycled build material composition may be exposed to 2, 4, 6, 8, 10, or more build cycles (i.e., heating to a temperature ranging from about 50° C. to about 205° C. and then cooling), and reclaimed after each cycle. Between cycles, the recycled build material composition may be mixed with at least some fresh (i.e., not previously used in a 3D printing process) build material composition 24. In some examples, the weight ratio of the recycled build material composition to the fresh build material composition may be 90:10, 80:20, 70:30, 60:40, 50:50, or 40:60. The weight ratio of the recycled build material composition to the fresh build material composition 24 may depend, in part, on the stability of the build material composition 24, the discoloration of the recycled build material composition (as compared to the build material composition 24), the desired aesthetics for the 3D object being formed, the thermal decomposition of the recycled build material composition (as compared to the build material composition), and/or the desired mechanical properties of the 3D object being formed.

Printing Methods

Referring now to FIG. 2, an example of a printing method 100 is disclosed. The printing method 100 includes applying a build material composition 14 to form a build material layer, the build material composition including a polyamide (reference numeral 102); based on a 3D object model, selectively applying a plasticizer on at least a portion of the build material layer, the plasticizer having: a formula (I):

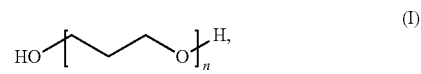

wherein n is an integer ranging from 3 to 8; or a formula (II):

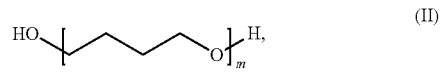

wherein m is an integer ranging from 3 to 8 (reference numeral 104); and based on the 3D object model, forming at least a region of a 3D object layer from the at least the portion of the build material layer (reference numeral 106).

In some examples of the method 100, the plasticizer is included in an elasticity agent 12 that is selectively applied on the at least the portion; and the forming of the at least the region of the 3D object layer includes: selectively applying a separate fusing agent 14, 14' on the at least the portion of the build material layer; and exposing the build material layer to electromagnetic radiation to coalesce the polyamide in the at least the portion. This example of the method 100 will be further described in reference to FIG. 3.

In some other examples of the method 100, the plasticizer is included in a fusing agent 16, 16' that is selectively applied on the at least the portion; and the forming of the at least the region of the 3D object layer includes exposing the build material layer to electromagnetic radiation to coalesce the polyamide in the at least the portion. This example of the method 100 will be further described in reference to FIG. 4.

In yet further examples of the method 100, the plasticizer is included in an elasticity agent 12 that is selectively applied on the at least the portion. In this example, forming the 3D object layer includes selectively exposing the at least the portion of the build material layer to a laser. This example of the method 100 will also be described below.

Prior to execution of any examples of the method 100, it is to be understood that a controller may access data stored in a data store pertaining to a 3D part/object that is to be printed. For example, the controller may determine the number of layers of the build material composition 24 that are to be formed, the locations at which any of the agents 12 and 14, 14' or 16, 16' and/or 18 and/or 20 is/are to be deposited on each of the respective layers, etc.

Printing with Elasticity Agent 12 and Fusing Agents 14 and/or 14'

Figure 3:
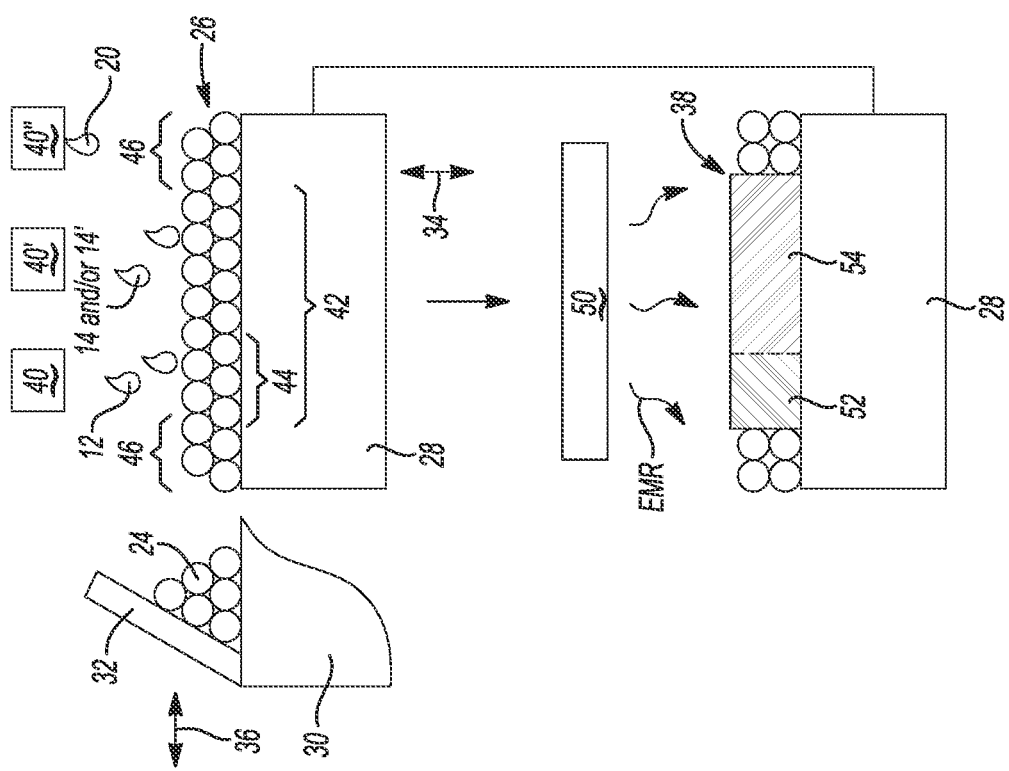
FIG. 3 is a graphic illustration of one example of the method for 3D printing.

Referring now to FIG. 3, an example of the method 100 which utilizes the elasticity agent 12 and the fusing agent 14, 14' is depicted.

In FIG. 3, a layer 26 of the build material composition 24 is applied on a build area platform 28. A printing system may be used to apply the build material composition 24. The printing system may include the build area platform 28, a build material supply 30 containing the build material composition 24, and a build material distributor 32.

The build area platform 28 receives the build material composition 24 from the build material supply 30. The build area platform 28 may be moved in the directions as denoted by the arrow 34, e.g., along the z-axis, so that the build material composition 24 may be delivered to the build area platform 28 or to a previously formed layer. In an example, when the build material composition 24 is to be delivered, the build area platform 28 may be programmed to advance (e.g., downward) enough so that the build material distributor 32 can push the build material composition 24 onto the build area platform 28 to form a substantially uniform layer of the build material composition 24 thereon. The build area platform 28 may also be returned to its original position, for example, when a new part is to be built.

The build material supply 30 may be a container, bed, or other surface that is to position the build material composition 24 between the build material distributor 32 and the build area platform 28. The build material supply 30 may include heaters so that the build material composition 24 is heated to a supply temperature ranging from about 25° C. to about 150° C. In these examples, the supply temperature may depend, in part, on the build material composition 24 used and/or the 3D printer used. As such, the range provided is one example, and higher or lower temperatures may be used.

The build material distributor 32 may be moved in the directions as denoted by the arrow 36, e.g., along the y-axis, over the build material supply 30 and across the build area platform 32 to spread the layer 26 of the build material composition 24 over the build area platform 28. The build material distributor 32 may also be returned to a position adjacent to the build material supply 30 following the spreading of the build material composition 24. The build material distributor 32 may be a blade (e.g., a doctor blade), a roller, a combination of a roller and a blade, and/or any other device capable of spreading the build material composition 24 over the build area platform 28. For instance, the build material distributor 32 may be a counter-rotating roller. In some examples, the build material supply 30 or a portion of the build material supply 30 may translate along with the build material distributor 32 such that build material composition 24 is delivered continuously to the material distributor 32 rather than being supplied from a single location at the side of the printing system as depicted in FIG. 3.

The build material supply 30 may supply the build material composition 24 into a position so that it is ready to be spread onto the build area platform 28. The build material distributor 32 may spread the supplied build material composition 24 onto the build area platform 28. The controller (not shown) may process "control build material supply" data, and in response, control the build material supply 30 to appropriately position the particles of the build material composition 24, and may process "control spreader" data, and in response, control the build material distributor 32 to spread the build material composition 24 over the build area platform 28 to form the layer 26 of the build material composition 24 thereon. In FIG. 3, one build material layer 26 has been formed.

The layer 26 has a substantially uniform thickness across the build area platform 28. In an example, the build material layer 26 has a thickness ranging from about 50 µm to about 120 µm. In another example, the thickness of the build material layer 26 ranges from about 30 µm to about 300 µm. It is to be understood that thinner or thicker layers may also be used. For example, the thickness of the build material layer 26 may range from about 20 µm to about 500 µm. The layer thickness may be about 2×0 (i.e., 2 times) the average diameter of the build material composition particles at a minimum for finer part definition. In some examples, the layer 26 thickness may be about 1.2× the average diameter of the build material composition particles.

After the build material composition 24 has been applied, and prior to further processing, the build material layer 24 may be exposed to heating. In an example, the heating temperature may be below the melting point of the polyamide of the build material composition 24. As examples, the pre-heating temperature may range from about 5° C. to about 50° C. below the melting point of the polyamide. In an example, the pre-heating temperature ranges from about 50° C. to about 205° C. In still another example, the pre-heating temperature ranges from about 100° C. to about 190° C. The low pre-heating temperature may enable the non-patterned build material composition 24 to be easily removed from the 3D object after completion of the 3D object. In these examples, the pre-heating temperature may depend, in part, on the build material composition 24 used. As such, the ranges provided are some examples, and higher or lower temperatures may be used.

Pre-heating the layer 26 may be accomplished by using any suitable heat source that exposes all of the build material composition 24 in the layer 26 to the heat. Examples of the heat source include a thermal heat source (e.g., a heater (not shown) integrated into the build area platform 28 (which may include sidewalls)) or a radiation source 50.

After the layer 26 is formed, and in some instances is pre-heated, the fusing agent(s) 14 and/or 14', and the elasticity agent 12 are selectively applied on at least some of the build material composition 24 in the layer 26.

To form a layer 38 of a 3D object, at least a portion (e.g., portion 42) of the layer 26 of the build material composition 24 is patterned with the fusing agent 14, 14'. Either fusing agent 14 or 14' may be used. When it is desirable to form a white, colored, or slightly tinted object layer 38, the primer fusing agent 14' may be used to pattern the build material composition 24. The primer fusing agent 14' is clear or slightly tinted, and thus the resulting 3D object layer 38 may appear white or the color of the build material composition 24. When it is desirable to form a darker color or black object layer 38, the core fusing agent 14 may be used. The core fusing agent 14 is dark or black, and thus the resulting 3D object layer 38 may appear grey, black or another dark color. The two fusing agents 14, 14' may be used to pattern different portions of a single build material layer 26, which will be described further in reference to FIG. 6. Color may also be added by using the coloring agent 18, which will also be described further in reference to FIG. 6.

The volume of the fusing agent 14, 14' that is applied per unit of the build material composition 24 in the patterned portion 42 may be sufficient to absorb and convert enough electromagnetic radiation so that the build material composition 24 in the patterned portion 42 will coalesce/fuse. The volume of the fusing agent 14, 14' that is applied per unit of the build material composition 24 may depend, at least in part, on the energy absorber used, the energy absorber loading in the fusing agent 14, 14', and the build material composition 24 used.

To increase the ductility of at least a portion (e.g., portion 52) of the layer 38 of the 3D object, corresponding portion (s) 44 of the build material composition 24 is/are patterned with the elasticity agent 12. The elasticity agent 12 may be applied in accordance with 3D object model wherever it is desirable for the final 3D object layer 38 to exhibit higher ductility. Utilizing an elasticity agent 12 that is separate from the fusing agent 14, 14' enables 3D parts with different mechanical properties (e.g., more ductile areas and more rigid areas) to be formed.

The volume of the elasticity agent 12 that is applied per unit of the build material composition 24 in the patterned portion 44 may depend upon whether it is desirable to impart ductility at the voxel surface and/or through the voxel volume, and upon the desired ductility of the resulting portion(s) 52 of the 3D object layer 38.

In the example shown in FIG. 3, the detailing agent 20 is also selectively applied to the portion(s) 46 of the layer 26. The portion(s) 46 are not patterned with the fusing agent 14, 14' and thus are not to become part of the final 3D object layer 38. Thermal energy generated during radiation exposure may propagate into the surrounding portion(s) 46 that do not have the fusing agent 14, 14' applied thereto. The propagation of thermal energy may be inhibited, and thus the coalescence of the non-patterned build material portion(s) 46 may be prevented, when the detailing agent 20 is applied to these portion(s) 46.

After the agents 12, 14 and/or 14', and 20 are selectively applied in the specific portion(s) 44, 42, 46 of the layer 26, the entire layer 26 of the build material composition 24 is exposed to electromagnetic radiation (shown as EMR in FIG. 3).

The electromagnetic radiation is emitted from the radiation source 50. The length of time the electromagnetic radiation is applied for, or energy exposure time, may be dependent, for example, on one or more of: characteristics of the radiation source 50; characteristics of the build material composition 24; and/or characteristics of the fusing agent 14, 14'.

It is to be understood that the electromagnetic radiation exposure may be accomplished in a single radiation event or in multiple radiation events. In an example, the exposing of the build material composition 24 is accomplished in multiple radiation events. In a specific example, the number of radiation events ranges from 3 to 8. In still another specific example, the exposure of the build material composition 24 to electromagnetic radiation may be accomplished in 3 radiation events. It may be desirable to expose the build material composition 24 to electromagnetic radiation in multiple radiation events to counteract a cooling effect that may be brought on by the amount of the agents 12, 14 and/or 14' that is applied to the build material layer 26. Additionally, it may be desirable to expose the build material composition 24 to electromagnetic radiation in multiple radiation events to sufficiently elevate the temperature of the build material composition 24 in the portion(s) 42, without over heating the build material composition 24 in the non-patterned portion(s) 46.

The fusing agent 14, 14' enhances the absorption of the radiation, converts the absorbed radiation to thermal energy, and promotes the transfer of the thermal heat to the build material composition 24 in contact therewith. In an example, the fusing agent 14, 14' sufficiently elevates the temperature of the build material composition 24 in the portion 42 to a temperature above the melting point of the polyamide, allowing coalescing/fusing (e.g., thermal merging, melting, binding, etc.) of the build material composition 24 to take place. The application of the electromagnetic radiation forms the 3D object layer 38.

In some examples, the electromagnetic radiation has a wavelength ranging from 800 nm to 4000 nm, or from 800 nm to 1400 nm, or from 800 nm to 1200 nm. Radiation having wavelengths within the provided ranges may be absorbed (e.g., 80% or more of the applied radiation is absorbed) by the fusing agent 14, 14' and may heat the build material composition 24 in contact therewith, and may not be substantially absorbed (e.g., 25% or less of the applied radiation is absorbed) by the non-patterned build material composition 24 in portion(s) 46.

In the example shown in FIG. 3, the 3D object layer 38 has a portion 52 with higher ductility (which corresponds with portion 44 patterned with both the fusing agent 14, 14' and the elasticity agent 12) and a portion 54 with unaltered mechanical properties (which correspond with the portion 42 patterned with the fusing agent 14, 14' alone).

After the 3D object layer 38 is formed, additional layer(s) may be formed thereon to create an example of the 3D object. To form the next layer, additional build material composition 24 may be applied on the layer 38. The fusing agent 14, 14' is then selectively applied on at least a portion of the additional build material composition 24, according to the 3D object model. The elasticity agent 12 may also be applied, for example, if increased ductility is desired in the next layer. The detailing agent 20 may be applied in any area of the additional build material composition 24 where coalescence is not desirable. After the agent(s) 12, 14, 14', 20 is/are applied, the entire layer of the additional build material composition 24 is exposed to electromagnetic radiation in the manner described herein. The application of additional build material composition 24, the selective application of the agent(s) 12, 14, 14', 20, and the electromagnetic radiation exposure may be repeated a predetermined number of cycles to form the final 3D object in accordance with the 3D object model.

Printing with Fusing Agents 16 and/or 16'

Referring now to FIG. 4, an example of the method 100 which utilizes the multi-functional fusing agent 16, 16' is depicted.

In FIG. 4, a layer 26' of the build material composition 24 is applied on the build area platform 28 as described in reference to FIG. 3 (e.g. from build material supply 30 and using build material distributor 32). The layer 26' has a substantially uniform thickness across the build area platform 28.

After the build material composition 24 has been applied, and prior to further processing, the build material layer 24 may be exposed to pre-heating in the manner described herein in reference to FIG. 3.

After the layer 26' is formed, and in some instances is pre-heated, the fusing agent(s) 16 and/or 16' is selectively applied on at least some of the build material composition 24 in the layer 26'.

To form a layer 38' of a 3D object, at least a portion (e.g., portion 48) of the layer 26' of the build material composition 24 is patterned with the fusing agent 16, 16'. Either fusing agent 16 or 16' may be used. When it is desirable to form a white, colored, or slightly tinted object layer 38', the primer fusing agent 16' may be used to pattern the build material composition 24. The primer fusing agent 16' is clear or slightly tinted, and thus the resulting 3D object layer 38' may appear white or the color of the build material composition 24. When it is desirable to form a darker color or black object layer 38', the core fusing agent 16 may be used. The core fusing agent 16 is dark or black, and thus the resulting 3D object layer 38' may appear grey, black or another dark color. The two fusing agents 16, 16' may be used to pattern different portions of a single layer 26', which will be described further in reference to FIG. 6. Color may also be added by using the coloring agent 18, which will also be described further in reference to FIG. 6.

The volume of the fusing agent 16, 16' that is applied per unit of the build material composition 24 in the patterned portion 48 may be sufficient to absorb and convert enough electromagnetic radiation so that the build material composition 24 in the patterned portion 42 will coalesce/fuse. The volume of the fusing agent 16, 16' that is applied per unit of the build material composition 24 may depend, at least in part, on the energy absorber used, the energy absorber loading in the fusing agent 16, 16', and the build material composition 24 used. In this example, the plasticizer is present in the fusing agent(s) 16, 16', and thus the separate elasticity agent 12 is not used.

In the example shown in FIG. 4, the detailing agent 20 is also selectively applied to the portion(s) 46' of the layer 26'.

After the agents 16 and/or 16' and 20 are selectively applied in the specific portion(s) 48, 46 of the layer 26', the entire layer 26 of the build material composition 24 is exposed to electromagnetic radiation (shown as EMR in FIG. 4) as described herein. The fusing agent 16, 16' enhances the absorption of the radiation, converts the absorbed radiation to thermal energy, and promotes the transfer of the thermal heat to the build material composition 24 in contact therewith. In an example, the fusing agent 16, 16' sufficiently elevates the temperature of the build material composition 24 in the portion 48 to a temperature above the melting point of the polyamide, allowing coalescing/fusing (e.g., thermal merging, melting, binding, etc.) of the build material composition 24 to take place.

The application of the electromagnetic radiation forms the 3D object layer 38'. Because the plasticizer is present in the fusing agent(s) 16, 16', the entire 3D object layer 38' that is formed will have increased ductility (e.g., compared to a 3D object layer that is formed without the plasticizer).

After the 3D object layer 38' is formed, additional layer(s) may be formed thereon to create an example of the 3D object. To form the next layer, additional build material composition 24 may be applied on the layer 38'. The fusing agent 16, 16' is then selectively applied on at least a portion of the additional build material composition 24, according to the 3D object model. The detailing agent 20 may be applied in any area of the additional build material composition 24 where coalescence is not desirable. After the agent(s) 16, 16', 20 is/are applied, the entire layer of the additional build material composition 24 is exposed to electromagnetic radiation in the manner described herein. The application of additional build material composition 24, the selective application of the agent(s) 16, 16', 20, and the electromagnetic radiation exposure may be repeated a predetermined number of cycles to form the final 3D object in accordance with the 3D object model.

Additional Printing Methods with Multiple Fusing Agents 14, 14', 16, 16'

While not shown in the drawings, it is to be understood that in another example of the method 100, the fusing agent 16, 16' with the plasticizer therein may be used to create higher ductility portions of a 3D object, and the fusing agents 14, 14' without the plasticizer therein may be used to create lower ductility portions of the same 3D object. In this example, the elasticity agent 12 may not be used because the fusing agent 16, 16' is used.

In some other examples of the method 100, the primer fusing agent 14' or 16' and the core fusing agent 14 or 16 may be used together. For example, it may be desirable to utilize the core fusing agent 14 or 16 to form the core (e.g., the center or inner-most portion) of the 3D object, and it may be desirable to utilize the primer fusing agent 14' or 16' to form the outermost layers of the 3D object. The core fusing agent 14 or 16 can impart strength to the core of the 3D object, while the primer fusing agent 14' or 16' enables white or a color to be exhibited at the exterior of the 3D object. In these examples, when the agents 14, 14' are used, it is to be understood that the elasticity agent 12 may also be used to impart the desirable ductility to one or more portions of the 3D object.

An example of a 3D object 56 formed with the primer fusing agent 14' or 16' and the core fusing agent 14 or 16 is shown in FIG. 5. To form this example of the 3D object 56, the core fusing agent 14 or 16 would be applied on multiple layers of the build material composition 24 to pattern the inner portions 58, 60, and 62, and the primer fusing agent 14' or 16' would be applied on multiple layers of the build material composition 24 to pattern the outermost (white) layer 64. After each build material layer is patterned with the agent(s) 14 or 16 and/or 14' or 16', electromagnetic radiation may be applied to solidify the respective patterned build material layers.

To impart color to the 3D object 56 shown in FIG. 5, the coloring agent 18 may be applied with the primer fusing agent 12' and/or on the layer 64 after the 3D object 56 is formed.

Another example of a 3D object 56' formed with the primer fusing agent 14' or 16' and the core fusing agent 14 or 16 is shown in FIG. 6. In this example, the coloring agent 18 is applied with the primer fusing agent 14' or 16' to generate colored portions 66 at the exterior surfaces of the object 56'. Since the primer fusing agent 14' or 16' is clear or slightly tinted and the build material composition 24 is white or off-white, the color of the coloring agent 18 will be the color of the resulting colored portions 66, as the colorant of the coloring agent 20 becomes embedded throughout the coalesced/fused build material composition of the colored portions 66.

To form this example of the 3D object 56', the outermost build material layer(s) and the outermost edges of the middle build material layers would be patterned with the primer fusing agent 14' or 16' and the coloring agent 18 to form colored portions 66 of the object 56'. The innermost portions of the middle build material layers would be patterned with the core fusing agent 14, 16 to form the core portions 58 of the object 56'. Portions of the build material layers that are between the outermost build material layer(s) and the middle build material layers, and that are between the outermost edges and the innermost portions of the middle build material layers may be patterned with the primer fusing agent 14' or 16' to form white portion(s) 64 of the object 56'. These white portions are formed between the core portions 58 and the colored portions 66. These white portions 64 form a mask over the core portions 66 because they optically isolate the black core portion(s) 58.

While several variations of the objects 56, 56' and the combinations of agents 14 or 16 and 14' or 16' have been described, it is to be understood that the fusing agents 14, 14' (along with agent 12) and/or 16, 16' may be used to form any desirable 3D object.

Printing with Elasticity Agent 12 Using SLS/SLM

In still another example of the method 100, the layers of the 3D object are formed via selective laser sintering (SLS) or selective laser melting (SLM). In this example of the method 100, no fusing agent 14, 14', 16, 16' is applied on the build material composition 24. Rather, an energy beam is used to selectively apply radiation to the portions of the build material composition 24 that are to coalesce/fuse to become part of the object.

In this example, the source of electromagnetic radiation may be a laser or other tightly focused energy source that may selectively apply radiation to the build material composition 24. The laser may emit light through optical amplification based on the stimulated emission of radiation. The laser may emit light coherently (i.e., constant phase difference and frequency), which allows the radiation to be emitted in the form of a laser beam that stays narrow over large distances and focuses on a small area. In some example, the laser or other tightly focused energy source may be a pulse laser (i.e., the optical power appears in pluses). Using a pulse laser allows energy to build between pluses, which enable the beam to have more energy. A single laser or multiple lasers may be used.

Also in this example, the elasticity agent 12 may be applied wherever is it desirable to impart ductility to the 3D object that is formed.

In any of the examples of the method 100 disclosed herein, any of the agents 12, 14, 14', 16, 16', 18 and/or 20 may be dispensed from an applicator 40, 40', 40" (as shown in FIGS. 3 and 4). The applicator(s) 40, 40', 40" may each be a thermal inkjet printhead, a piezoelectric printhead, a continuous inkjet printhead, etc., and the selective application of the agent(s) 12, 14, 14', 16, 16', 18 and/or 20 may be accomplished by thermal inkjet printing, piezo electric inkjet printing, continuous inkjet printing, etc. The controller may process data, and in response, control the applicator(s) 40, 40', 40" to deposit the agent(s) 12, 14, 14', 16, 16', 18 and/or 20 onto predetermined portion(s) of the build material composition 24. It is to be understood that the applicators 40, 40', 40" may be separate applicators or a single applicator with several individual cartridges for dispensing the respective agents 12, 14, 14', 16, 16', 18 and/or 20.

It is to be understood that the selective application of any of the agents 12, 14, 14', 16, 16', 18 and/or 20 may be accomplished in a single printing pass or in multiple printing passes. In some examples, the agent(s) 12, 14, 14', 16, 16', 18 and/or 20 is/are selectively applied in a single printing pass. In some other examples, the agent(s) 12, 14, 14', 16, 16', 18 and/or 20 is/are selectively applied in multiple printing passes. In one of these examples, the number of printing passes ranging from 2 to 4. In still other examples, 2 or 4 printing passes are used. It may be desirable to apply the agent(s) 12, 14, 14', 16, 16', 18 and/or 20 in multiple printing passes to increase the amount, e.g., of the energy absorber, plasticizer, colorant, etc. that is applied to the build material composition 24, to avoid liquid splashing, to avoid displacement of the build material composition 24, etc.

To further illustrate the present disclosure, examples are given herein. It is to be understood that these examples are provided for illustrative purposes and are not to be construed as limiting the scope of the present disclosure.

EXAMPLES

Example 1

Poly(trimethylene glycol) plasticizers were used in this example—one with a molecular weight of 250 Da (SENSATIS® H250) and the other with a molecular weight of 500 Da (VELVETOL® H500).

Each of the plasticizers was dry blended, at 8% loading, with polyamide 12 (VESTOSINT® Z2723 available from Evonik Degussa). The mixing profile included: 800 rpm for about 30 seconds, 1200 rpm for about 50 seconds, and 800 rpm for about 30 seconds. The first sample mixture was made with the 250 Da plasticizer and the second sample mixture was made with the 500 Da plasticizer.

The first mixture was injection molded to form four different $1^{st}$ sample (type 5) dogbones, and the second mixture was injection molded to form four different $2^{nd}$ sample (type 5) dogbones. For comparison, the polyamide 12 without any plasticizer was also injection molded to form four different control sample dogbones.

The elongation at break, Young's Modulus, and ultimate tensile strength of the samples and control samples were measured using Instron testing equipment. The average results of the four $1^{st}$ sample dogbones, the four $2^{nd}$ sample dogbones, and the four control sample dogbones are shown in FIG. 7. As depicted, both of the plasticizers (the 250 Da poly(trimethylene glycol) in the $1^{st}$ samples and the 500 Da poly(trimethylene glycol) in the $2^{nd}$ samples) impacted the elongation at break and the Young's Modulus as compared to the control samples. The 250 Da poly(trimethylene glycol) has a higher impact on modulus than the 500 Da poly(trimethylene glycol), and thus may be more desirable in some instances.

As a comparative plasticizer, a tosylamide (KETJENFLEX® 9S available from Akzo Chemie) was used. The comparative plasticizer was dry blended, at 8% loading, with polyamide 12 (VESTOSINT® Z2723). The mixing profile included: 800 rpm for about 30 seconds, 1200 rpm for about 50 seconds, and 800 rpm for about 30 seconds. The comparative mixture (including tosylamide) was then injection molded to form four different comparative dogbones.

Figure 8:
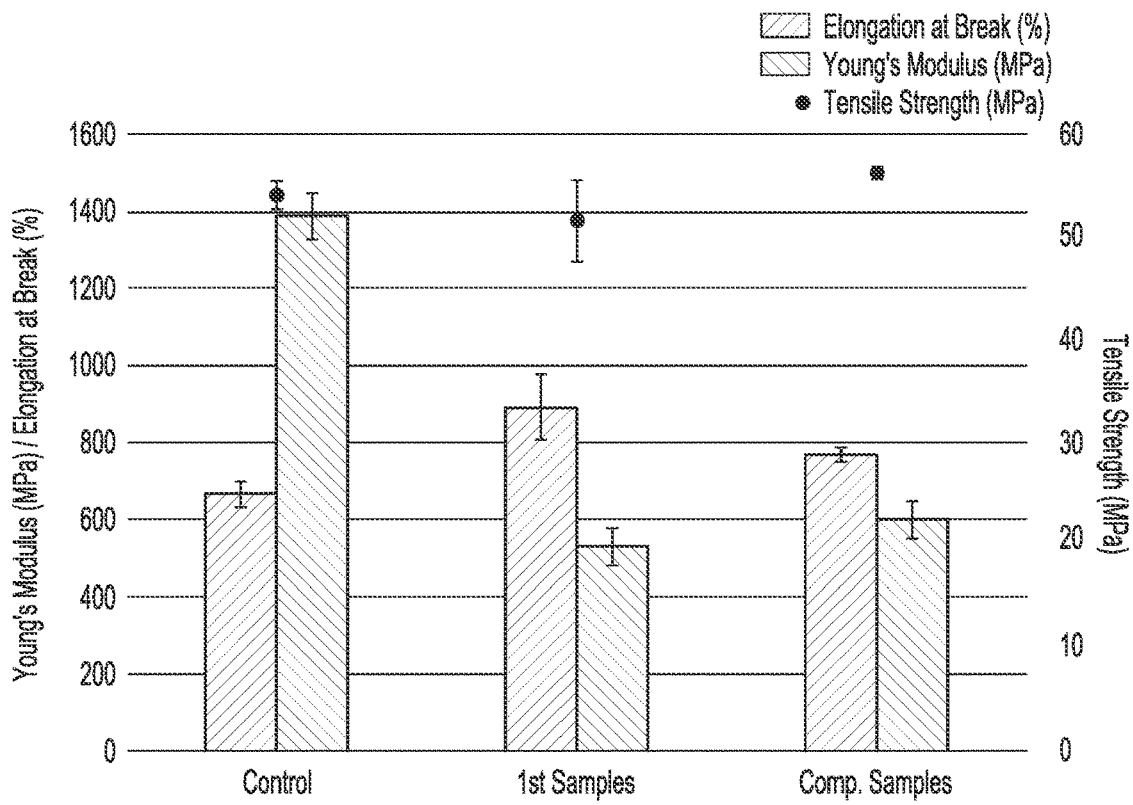
FIG. 8 is a graph illustrating the elongation at break (%, left Y axis), the Young's Modulus (MPa, left Y axis), and the tensile strength (MPa, right Y axis) of two different comparative samples, and an example sample.

The elongation at break, Young's Modulus, and Tensile Strength of the comparative samples were measured using Instron testing equipment. The average results of the comparative samples are shown in FIG. 8 against the control samples (with no plasticizer) and the 1$^{st}$ samples (formed with the 250 Da plasticizer). FIG. 8 shows that the elongation at break of the 1$^{st}$ samples was greater than the elongation at break of the comparative samples, and that the Young's Modulus of the 1$^{st}$ samples was less than the Young's Modulus of the comparative samples. FIG. 8 also shows that the ultimate tensile strength of the 1$^{st}$ samples and the comparative samples were comparable. Overall, these results indicate that the 250 Da plasticizer imparted greater ductility to the 1$^{st}$ samples than the comparative plasticizer imparted to the comparative samples. The poly(trimethylene glycol) plasticizer is also made from renewably sources feedstocks, and thus may be more desirable than tosylamide plsaticizer.

Example 2

An example elasticity agent and three comparative elasticity agents were prepared. The elasticity agent included the 250 Da poly(trimethylene glycol) plasticizer and each of the comparative elasticity agents included p-toluene sulfonamide (PTSA) as the plasticizer. The formulations are shown in Table 1.

TABLE 1

|  | EA 1 | CEA 2 | CEA 3 | CEA 4 |
|---|---|---|---|---|
| Plasticizer | 250 Da poly (trimethylene glycol) | PTSA | PTSA | PTSA |
| Plasticizer loading | 20 wt % | 20 wt % | 10 wt % | 8 wt % |
| Vehicle | 1 | 2 | 3 | 3 |

Vehicles 1 and 2 are shown in Table 2.

TABLE 2

| Component | Vehicle 1 (wt %) | Vehicle 2 (wt %) | Vehicle 3 (wt %) |
|---|---|---|---|
| Co-solvent | 15 | 34 | 49 |
| Surfactant | 0.85 | 0.75 | 0.15 |
| Chelating agent | 0.05 | 0.08 | 0.04 |
| Anti-kogation agent | 0.5 | 0.45 | — |
| Buffer | 0.10 | — | 0.1 |
| Antimicrobial agent | 0.3218 | 0.055 | — |
| Water | balance | balance | balance |

Several XY- and Z-dogbones were 3D printed on a testbed printed using a fusing agent (containing carbon black as the energy absorber) and the example and comparative example elasticity agents. The fusing agent was applied at about 11 ng per 1/600$^{th}$ of an inch$^2$ and the elasticity agents were respectively applied at about 17 ng per 1/600$^{th}$ of an inch$^2$. A control sample was formed with the fusing agent and without any elasticity agent.

Figure 9:
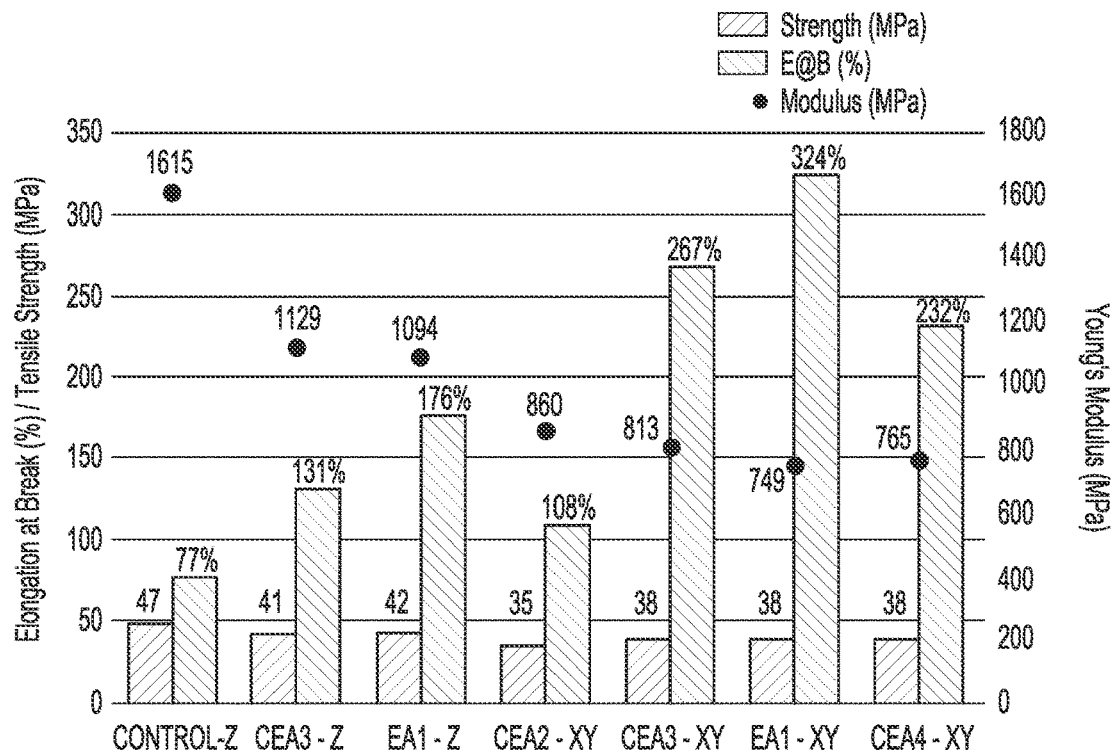
FIG. 9 is a graph illustrating the elongation at break (%, left Y axis), the Young's Modulus (MPa, right Y axis), and the tensile strength (MPa, left Y axis) of Z-dogbones and XY-dogbones printed with no elasticity agent (control), an example elasticity agent (EA1), and several different comparative example elasticity agents (CEA2-CEA4).

The elongation at break, Young's Modulus, and Tensile Strength of the XY- and Z-dogbones were measured using Instron testing equipment. The average results are shown in FIG. 9. As depicted, the example elasticity agent (EA1, containing the 250 Da poly(trimethylene glycol) plasticizer) and the comparative elasticity agents (CEA2, CEA3, CEA4) lowered the Young's Modulus and the tensile strength and increased elongation at break. Overall, the results indicate that the example elasticity agent performed the best.

It is to be understood that the ranges provided herein include the stated range and any value or sub-range within the stated range, as if such values or sub-ranges were explicitly recited. For example, from about 1 wt % to about 35 wt % should be interpreted to include not only the explicitly recited limits of from about 1 wt % to about 35 wt %, but also to include individual values, such as about 2.35 wt %, about 3.5 wt %, about 10 wt %, about 15 wt %, about 25.74 wt %, about 26 wt %, about 27.15 wt %, 32.64 wt %, etc., and sub-ranges, such as from about 2.5 wt % to about 25 wt %, from about 4.5 wt % to about 16.5 wt %, from about 4.75 wt % to about 19 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A fusing agent for three-dimensional (3D) printing, comprising:
    an energy absorber; and
    a plasticizer having:
        a formula (I):

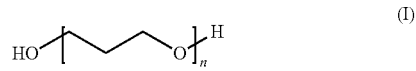

(I)

wherein n is an integer ranging from 3 to 8; or
        a formula (II):

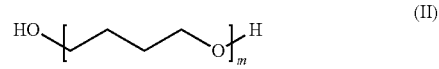

(II)

wherein m is an integer ranging from 3 to 8;
        wherein the plasticizer is present in an amount ranging from about 1 wt % to about 35 wt %, based on a total weight of the fusing agent; and the plasticizer has a solubility threshold that renders the plasticizer 20% soluble in 1) water or ii) a water-based system that includes at least 25 wt % water, based on a total weight of the water-based system.

2. The fusing agent as defined in claim 1 wherein the plasticizer has the formula (I) and wherein n is 4 or 5.

3. The fusing agent as defined in claim 1 wherein the plasticizer has the formula (II) and wherein m is 5.

4. The fusing agent as defined in claim 1 wherein the plasticizer has a viscosity at 25° C. ranging from about 100 mPa·s to about 150 mPa·s.

5. The fusing agent as defined in claim 1 wherein the plasticizer has a molecular weight ranging from about 192 Daltons to about 595 Daltons.

6. The fusing agent as defined in claim 1 wherein the plasticizer has a molecular weight ranging from about 250 Daltons to about 500 Daltons.

7. The fusing agent as defined in claim 1, further comprising a liquid vehicle, wherein the energy absorber and the plasticizer are dispersed or dissolved in the liquid vehicle.

8. The fusing agent as defined in claim 7 wherein the liquid vehicle includes either an aqueous solvent or a non-aqueous solvent.

9. The fusing agent as defined in claim 8 wherein the liquid vehicle further includes an additional component selected from the group consisting of a co-solvent, a humectant, a surfactant, an antimicrobial agent, an anti-kogation agent, a chelating agent, and a combination thereof.

10. A method for three-dimensional (3D) printing, comprising:
  applying a build material composition to form a build material layer, the build material composition including a polyamide;
  based on a 3D object model, selectively applying a fusing agent including a plasticizer on at least a portion of the build material layer, the plasticizer having:
  a formula (I):

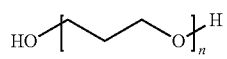

(I)

wherein n is an integer ranging from 3 to 8; or a formula (II):

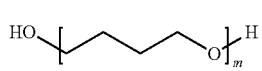

(II)

wherein m is an integer ranging from 3 to 8; and based on the 3D object model, forming at least a region of a 3D object layer from the at least the portion of the build material layer;
  wherein the plasticizer is present in an amount ranging from about 1 wt % to about 35 wt %, based on a total weight of the fusing agent; and the plasticizer has a solubility threshold that renders the plasticizer 20% soluble in 1) water or ii) a water-based system that includes at least 25 wt % water, based on a total weight of the water-based system.

11. The method as defined in claim 10 wherein the forming of the at least the region of the 3D object layer includes exposing the build material layer to electromagnetic radiation to coalesce the polyamide in the at least the portion.

12. The method as defined in claim 10, further comprising selectively applying a detailing agent to the at least the portion of the build material layer, wherein the detailing agent includes a surfactant, a co-solvent, and water.

13. The method as defined in claim 10 wherein the plasticizer has the formula (I) and wherein n is 4 or 5.

14. The method as defined in claim 10 wherein the plasticizer has the formula (II) and wherein m is 5.

15. The method as defined in claim 10 wherein the plasticizer has a viscosity at 25° C. ranging from about 100 mPa·s to about 150 mPa·s.

16. The method as defined in claim 10 wherein the plasticizer has a molecular weight ranging from about 192 Daltons to about 595 Daltons.

* * * * *